United States Patent
Fu

(10) Patent No.: US 12,174,329 B2
(45) Date of Patent: Dec. 24, 2024

(54) CODED INTERLEAVED SIMULTANEOUS SOURCE SHOOTING

(71) Applicant: BP Corporation North America Inc., Houston, TX (US)

(72) Inventor: Kang Fu, Katy, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 232 days.

(21) Appl. No.: 17/636,463

(22) PCT Filed: Aug. 28, 2020

(86) PCT No.: PCT/US2020/048318
§ 371 (c)(1),
(2) Date: Feb. 18, 2022

(87) PCT Pub. No.: WO2021/050289
PCT Pub. Date: Mar. 18, 2021

(65) Prior Publication Data
US 2022/0299668 A1 Sep. 22, 2022

Related U.S. Application Data

(60) Provisional application No. 62/900,066, filed on Sep. 13, 2019.

(51) Int. Cl.
*G01V 1/38* (2006.01)
(52) U.S. Cl.
CPC ...... *G01V 1/3808* (2013.01); *G01V 2210/127* (2013.01)

(58) Field of Classification Search
CPC ............. G01V 1/3808; G01V 2210/127
See application file for complete search history.

(56) References Cited

U.S. PATENT DOCUMENTS

| 8,295,124 B2 | 10/2012 | Abma | |
|---|---|---|---|
| 2010/0054896 A1* | 3/2010 | Lababidy | G01V 1/3843 414/137.7 |
| 2012/0147701 A1* | 6/2012 | Ross | G01V 1/3861 367/37 |
| 2014/0355379 A1 | 12/2014 | Moldoveanu et al. | |
| 2015/0260867 A1* | 9/2015 | Abma | G01V 1/005 367/7 |

OTHER PUBLICATIONS

PCT/US2020/048318 International Search Report and Written Opinion dated Mar. 9, 2021 (13 p.).
GCC Examination Report dated Sep. 29, 2021, for GCC Application No. 2020-40451 (3 p.).

* cited by examiner

Primary Examiner — Isam A Alsomiri
Assistant Examiner — Abdallah Abulaban
(74) *Attorney, Agent, or Firm* — CONLEY ROSE, P.C.

(57) ABSTRACT

System and techniques to position a first source array at a fixed first inline distance from a vessel, position a second source array at a fixed second inline distance from a vessel, wherein the fixed second horizontal inline distance differs from the fixed first horizontal distance, generating a spatial coding, fire the first source array, and fire the second source array.

20 Claims, 10 Drawing Sheets

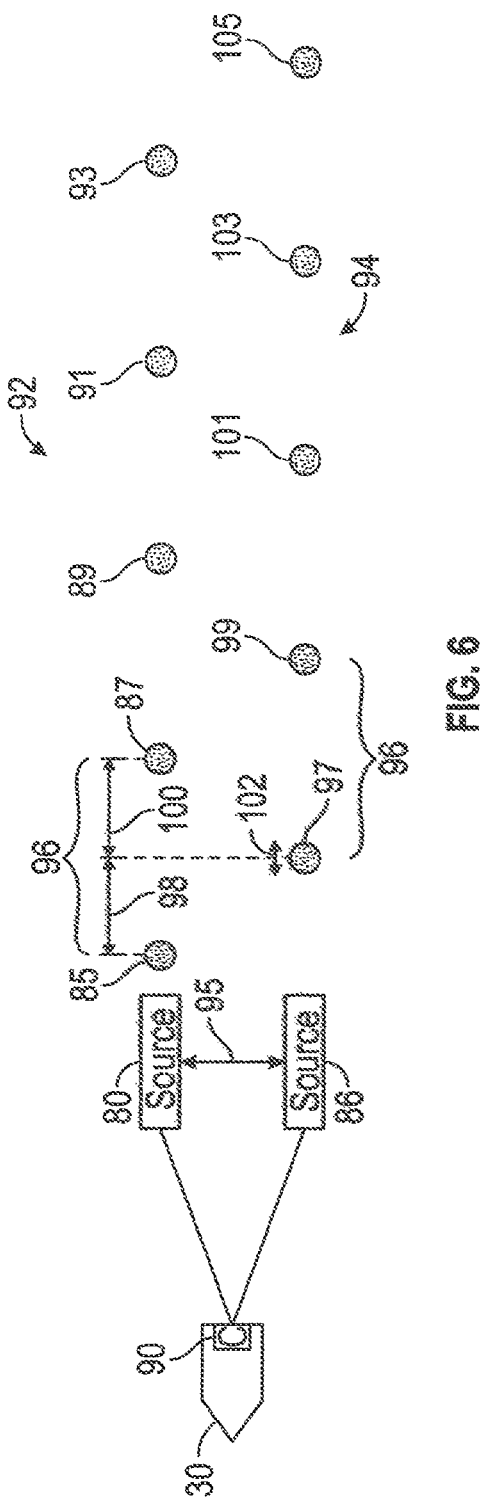

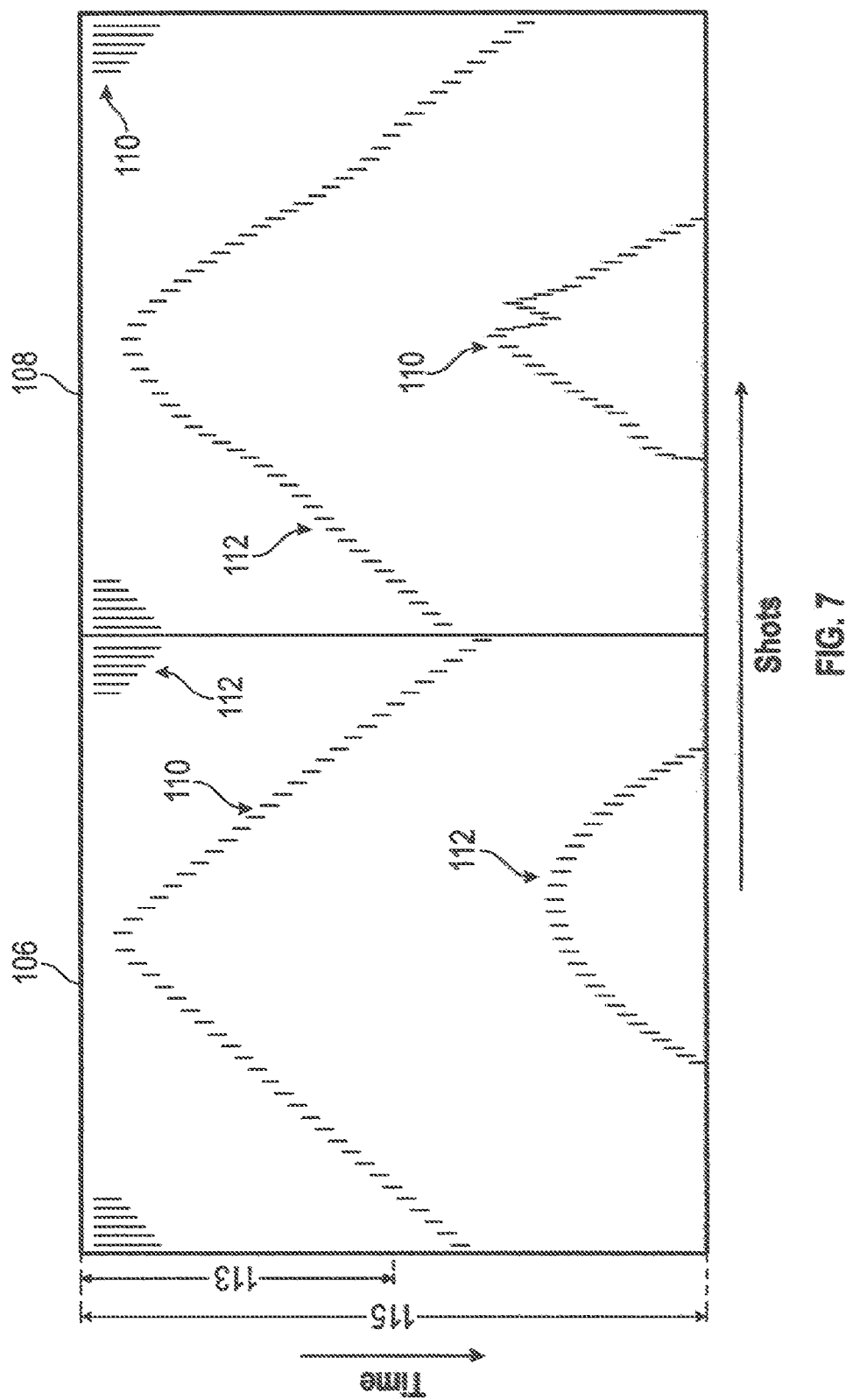

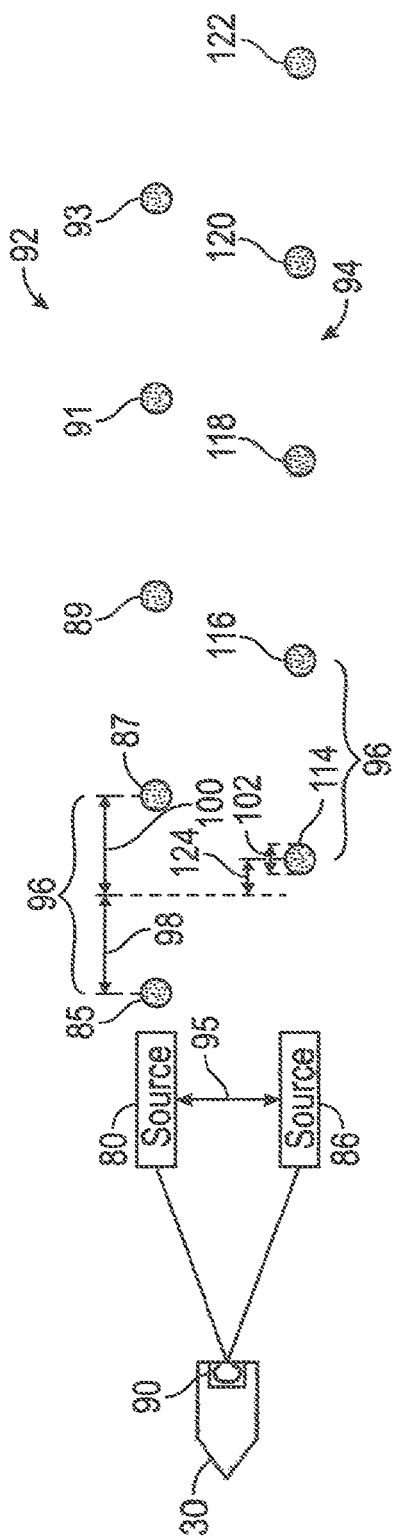
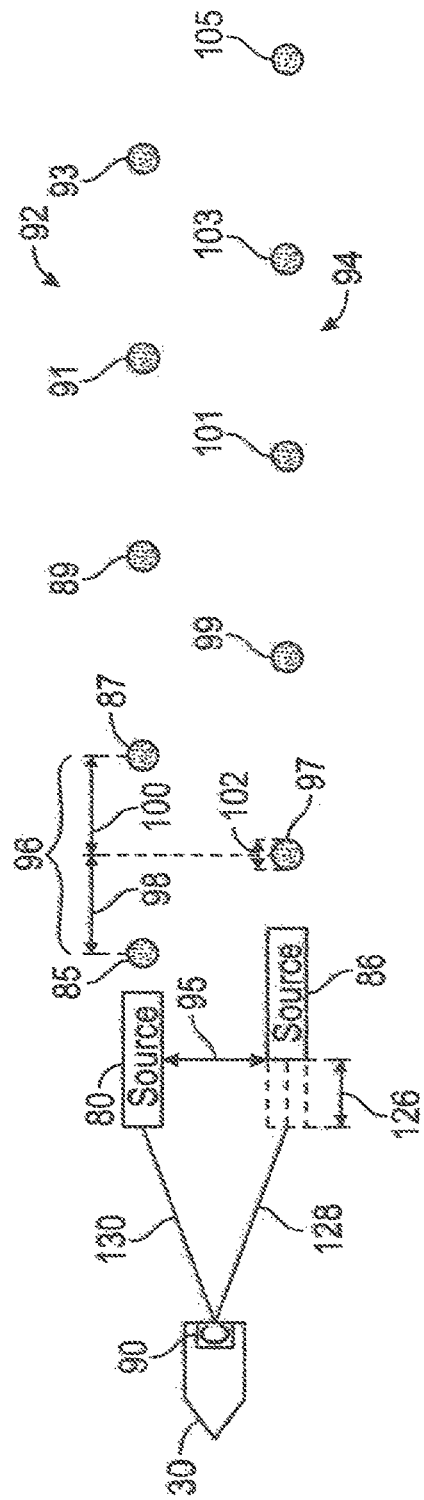

CODED INTERLEAVED SIMULTANEOUS SOURCE SHOOTING

CROSS-REFERENCE TO RELATED APPLICATIONS

This application is a 35 U.S.C. § 371 U.S. National Stage Entry application of PCT/US2020/048318 filed Aug. 28, 2020, and entitled "Coded Interleaving Simultaneous Source Shooting," and claims benefit of U.S. provisional patent application Ser. No. 62/900,066 filed Sep. 13, 2019, and entitled "Coded Interleaving Simultaneous Source Shooting," each of which is hereby incorporated herein by reference in its entirety for all purposes.

STATEMENT REGARDING FEDERALLY SPONSORED RESEARCH OR DEVELOPMENT

Not applicable.

BACKGROUND

The present disclosure relates generally to seismic data acquisition, and more specifically, to simultaneous source shooting techniques to increase the separability of overlapping shots.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending acoustic energy down into the ground and recording the reflected acoustic energy that returns from the geological layers within the subsurface region. During a seismic survey, an energy source is placed at various locations on or above the surface region of the Earth, which may include hydrocarbon deposits. Each time the source is activated, the source generates a seismic (e.g., acoustic wave) signal that travels downward through the Earth, is reflected, and, upon its return, is recorded using one or more receivers disposed on or above the subsurface region of the Earth. The seismic data recorded by the receivers may be used to create an image or profile of the corresponding subsurface region.

Seismic data acquisition can be a time consuming and expensive process. One technique to reduce the time and cost required to acquire seismic data is the use of two or more sources that are fired close in time to one another (i.e., multiple sources are sequentially activated during a single recording period). However, while this technique may decrease the amount of time and cost associated with seismic acquisition, the resultant seismic data may include noise. One example of this noise is blending noise, which refers to signals received during data collection periods that interfere with a current data collection period and may be read as noise (e.g., weak-coherence energy or signal) despite being part of a primary signal (e.g., coherent energy or signal) for a subsequent input data (e.g., input seismic data) collection period. It may be desired to develop and/or improve techniques associated with seismic acquisition that increase the incoherency of the resultant noise generated from the firing of two or more sources during a data collection period such that the resultant noise may be separated by data processing.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic acquisition utilizing sources and receivers may be useful in the generation of, for example, seismic images. Seismic images may be used, for example, in the determination of hydrocarbon deposits (e.g., areas within a subsurface that contain hydrocarbons) and/or subsurface drilling hazards. Seismic images are generally produced using seismic waveforms produced by a source, reflected off regions within a subsurface, and received by one or more receivers. However, noise associated with the seismic acquisition can render portions of the gathered data unusable.

Accordingly, present techniques include towing multiple source arrays to increase data density and/or reduce operation run time & cost. The activation of each array interleaves (i.e., flip flop acquisition for a dual-source-arrays configuration) so that the source arrays are sequentially fired with respect to one another. The shot point positions of each arrays also are dithered, such that the time at which a shot is undertaken is offset by a random amount of time, for example, between approximately −250 milliseconds and +250 milliseconds (ms).

In other embodiments, to further increase the incoherency of noise, the activations of the arrays are interleaved and their respective shot point positions are dithered and the source arrays are staggered. This staggering of at least one array can be accomplished via a positional offset between one of the arrays with respect to another of the arrays and/or a positional offset of at least one of the arrays with respect to the towing vessel. Alternatively, the staggering of the arrays can be accomplished via a shift in the shot point position (i.e., the time at which the shot point is made) for at least one array of the multiple arrays. The staggering can be applied to an array or shot point position in each sail line, and the staggering can be pre-defined or randomized (on a sail line by sail line or on a shot line by shot line manner) to create more randomness and incoherency resulting noise. Furthermore, when more than 2 seismic sources (e.g., arrays) are towed by the same source vessel, different shifts can be applied to each of the sources (e.g., arrays) to produce stronger incoherency of blending noise, creating a spatial coding pattern on the source arrays or shot point positions. Through application of the spatial coding to a source array geometry or source shot point positions, increases in the separability of overlapping shots can be achieved.

A benefit to utilizing staggering, dithering, and interleaving (or other sequenced array firing) is that neighboring lines no longer have the same noise pattern, which increases the randomness/incoherency of the blending noise, thus reduces the complexity of deblending of the received seismic data, especially when the data is sorted in 3D (or higher dimensions).

BRIEF DESCRIPTION OF THE DRAWINGS

Various aspects of this disclosure may be better understood upon reading the following detailed description and upon reference to the drawings in which:

FIG. 6 illustrates a first technique of seismic acquisition in a marine environment utilizing the marine survey system of FIG. 2 or the second marine survey system of FIG. 3, in accordance with embodiments presented herein;

FIG. 7 illustrates an inline section view of seismic data gathered from the technique of FIG. 6, in accordance with embodiments presented herein;

FIG. 8 illustrates a second technique of seismic acquisition in a marine environment utilizing the marine survey system of FIG. 2 or the second marine survey system of FIG. 3, in accordance with embodiments presented herein;

FIG. 9 illustrates a third technique of seismic acquisition in a marine environment utilizing the marine survey system of FIG. 2 or the second marine survey system of FIG. 3, in accordance with embodiments presented herein;

DETAILED DESCRIPTION OF SPECIFIC EMBODIMENTS

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Analysis of seismic data may provide valuable information, such as the location and/or change of hydrocarbon deposits within a subsurface region of the Earth. The present disclosure generally discusses techniques that may be used to obtain seismic data with reduced noise by altering the acquisition techniques and/or locations for energy sources used in a seismic survey. Improvements to the acquisition design allow for increases of the data density and provide additional advantages of increase efficiency.

Figure 1:
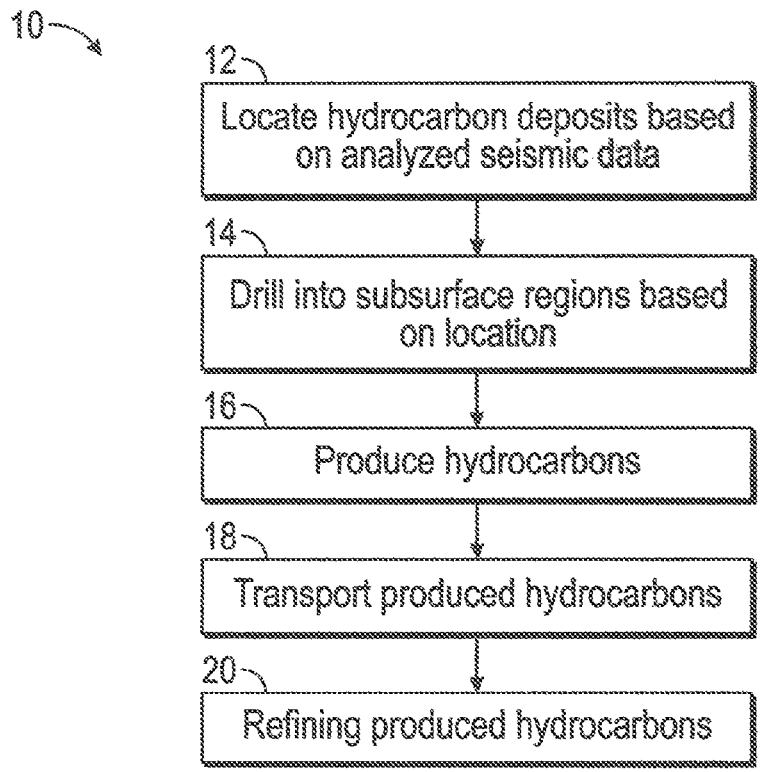
FIG. 1 illustrates a flow chart of various processes that may be performed based on analysis of seismic data acquired via a seismic survey system, in accordance with embodiments presented herein.
Figure 2:
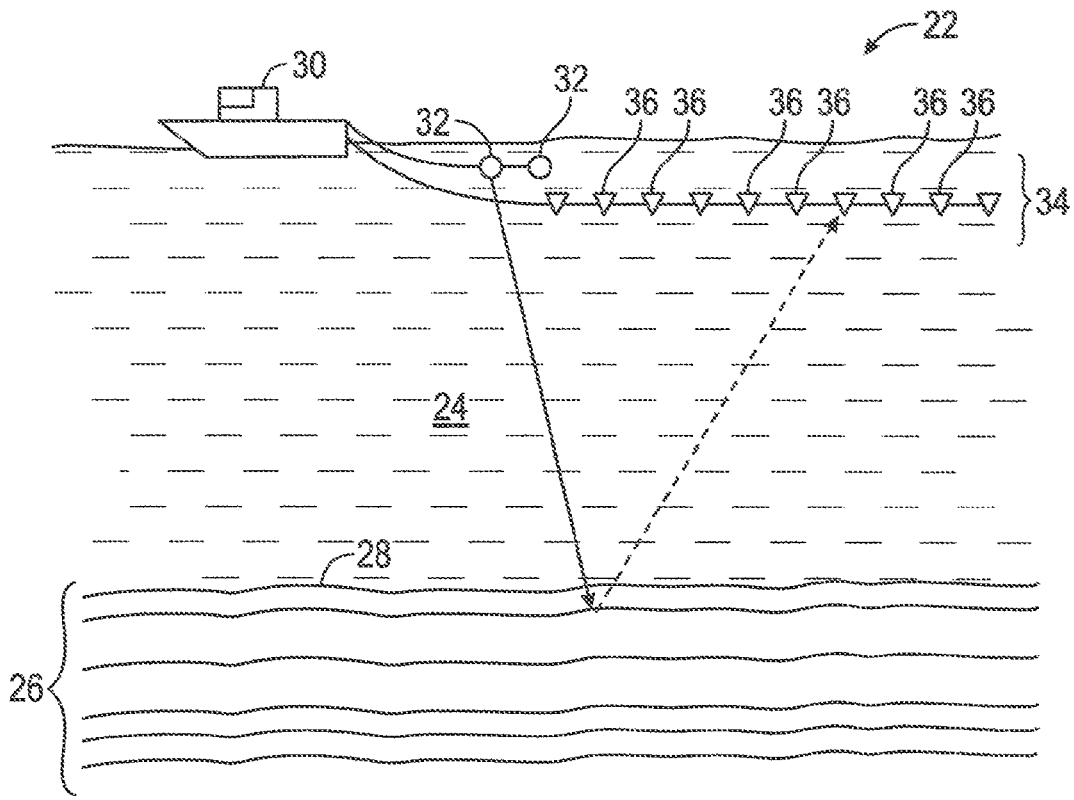
FIG. 2 illustrates a marine survey system in a marine environment, in accordance with embodiments presented herein.
Figure 3:
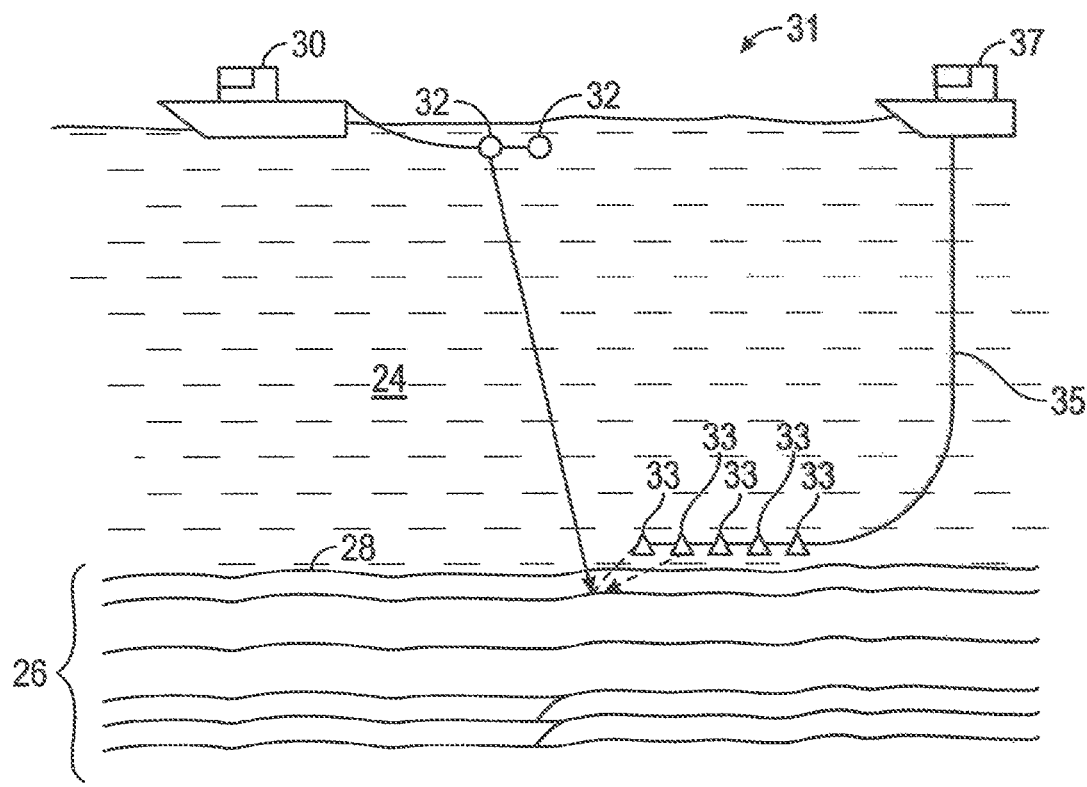
FIG. 3 illustrates a second marine survey system in a marine environment, in accordance with embodiments presented herein.

By way of introduction, seismic data may be acquired by using a variety of seismic survey systems and techniques, examples of which are discussed with respect to FIG. 2 and FIG. 3. Regardless of the gathering technique utilized, after the seismic data is acquired, a computing system may analyze the acquired seismic data and use results of the seismic data analysis (e.g., seismogram, map of geological formations, or the like) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it is noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via one or more seismic acquisition techniques may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries, storage facilities, processing sites, and the like, via transport vehicles, pipelines, and the like. At block 20, the produced hydrocarbons may be processed according to various refining procedures to develop different products using the hydrocarbons.

It is noted that the processes discussed with regard to the method 10 may include other suitable processes that may be based on the locations and properties of hydrocarbon deposits as indicated in the seismic data acquired via one or more seismic survey. As such, it may be understood that the processes described above are not intended to depict an exhaustive list of processes that may be performed after determining the locations and properties of hydrocarbon deposits within the subsurface region.

With the forgoing in mind, FIG. 2 illustrates a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, one or more sources 32, a streamer 34, one or more receivers 36, and/or other equipment that may assist in acquiring seismic images representative of geological formations within a subsurface region 26 of the Earth. The vessel 30 may tow the one or more seismic sources 32 (e.g., an airgun array, another array of energy sources, a single energy source, or a combination thereof) that may produce energy, such as acoustic waves (e.g., seismic waveforms), that is directed at a seafloor 28. The vessel 30 may also tow the streamer 34 having the one or more receivers 36 (e.g., one or more hydrophones) that may acquire seismic waveforms that represent the energy output by the seismic sources 32 subsequent to being reflected off of various geological formations (e.g., salt domes, faults, folds, etc.) within the subsurface region 26. Additionally, although the marine survey system 22 is described with one or more seismic sources 32 (represented in FIG. 2 as an airgun array) and one or more receivers 36 (represented in FIG. 2 as a plurality of hydrophones), it is noted that the marine survey system 22 may include multiple seismic sources 32 and multiple seismic receivers 36. In the same manner, although the above descriptions of the marine survey system 22 is described with one seismic streamer 34, it is noted that the marine survey system 22 may include multiple seismic streamers 34. In addition, additional vessels 30 may include additional seismic sources 32, streamers 34, and the like to perform the operations of the marine survey system 22.

FIG. 3 illustrates an Ocean Bottom Seismic (OBS) system as a second marine survey system 31 (e.g., for use in conjunction with block 12 of FIG. 1) that also may be employed to acquire seismic data (e.g., waveforms) regarding a subsurface region of the Earth in a marine environment. The OBS system may operate to generate seismic data (e.g., OBS datasets). While the illustrated OBS system is an Ocean Bottom Cable (OBC) system inclusive of one or more receivers 33 disposed on the seafloor 28 coupled via a cable 35 to a second vessel 37, other embodiments of an OBS system, such as an Ocean Bottom Node (OBN) system or any other seismic system that produces higher signal-to-noise images at differing frequencies compared to those of the marine survey system 22 may be utilized.

As illustrated, the OBS system may include one or more seismic sources 32 (e.g., an airgun array, another array of energy sources, a single energy source, or a combination thereof) that is towed by a vessel 30 and which may produce energy, such as sound waves (e.g., seismic waveforms), that is directed at the seafloor 28. This energy may be reflected off of various geological formations within the subsurface region 26 and subsequently acquired (e.g., received and/or recorded) by the one or more receivers 33 disposed on the seafloor 28. For example, data may be stored in the one or more receivers 33 for an extended period of time (e.g., hours, days, weeks, or longer) prior to the stored data being retried (either via cable 35 or wirelessly). As illustrated, the one or more receivers 33 may be coupled to a vessel 37 (and, in some embodiments, to one another) via the cable 35. Data acquired via the one or more receivers 33 may be transmitted via the cable 35 to the vessel 37 (or, for example, wirelessly if the OBS system is an OBN system). Although the marine survey system 31 is described with one or more seismic sources 32 (represented in FIG. 3 as an airgun array), it is noted that the marine survey system 31 may include multiple seismic sources 32.

In some embodiments, the OBS system may be utilized to acquire OBS datasets that are useful in reservoir mapping and characterization. These OBS datasets typically have a bandwidth from approximately 2 Hz to 100 Hz with relatively high signal-to-noise ratio (SNR) results at low frequencies (e.g., at less than or equal to approximately 50 Hz, 40 Hz, 35 Hz, etc.) relative to 3DHR datasets. Therefore, the OBS dataset is complementary with respect to bandwidth a 3DHR dataset acquired via the marine survey system 22 (e.g., acquired via a 2D high-resolution seismic acquisition, a 3D high-resolution seismic acquisition, or the like).

Figure 4:
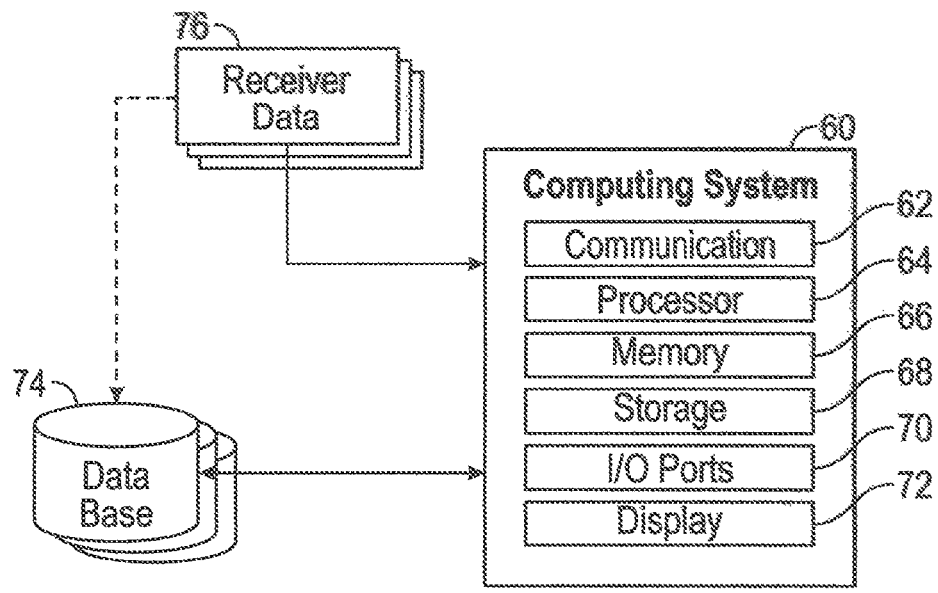
FIG. 4 illustrates a computing system that may perform operations described herein based on data acquired via the marine survey systems of FIG. 2 and/or the survey system of FIG. 3, in accordance with embodiments presented herein.

Although the methods and systems described herein are primarily directed to marine applications, they also may be applicable in land seismic operations. Regardless of how the seismic data is acquired, a computing system (e.g., for use in conjunction with block 12 of FIG. 1) may analyze the seismic waveforms acquired by the seismic receivers 33 and/or 36 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the receivers 36, 44, or 46 to determine the structure of the geological formations within the subsurface region 26.

Referring now to FIG. 4, the computing system 60 may include a communication component 62, a processor 64, memory 66 (e.g., a tangible, non-transitory, machine readable media), storage 68 (e.g., a tangible, non-transitory, machine readable media), input/output (I/O) ports 70, a display 72, and the like. The communication component 62 may be a wireless or wired communication component that may facilitate communication between the receivers 36, 44, 46, one or more databases 74, other computing devices, and other communication capable devices. In one embodiment, the computing system 60 may receive receiver data 76 (e.g., seismic data, seismograms) previously acquired by seismic receivers via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code or instructions to implement the methods described herein. The processor 64 may also include multiple processors that may perform the operations described below. The memory 66 and the storage 68 may be any suitable article of manufacture serving as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also store the data, analysis of the data, the software applications, and the like. The memory 66 and the storage 68 may represent tangible, non-transitory, computer-readable media (e.g., any suitable form of memory or storage) that may store the processor-executable code used by the processor 64 to perform various techniques described herein. It may be noted that tangible and non-transitory merely indicates that the media is tangible and is not a signal.

The I/O ports 70 are interfaces that may couple to other peripheral components such as input devices (e.g., keyboard, mouse), sensors, input/output (I/O) modules, and the like. The I/O ports 70 may enable the computing system 60 to communicate with the other devices in the marine survey system 22 or the marine survey system 31.

The display 72 may depict visualizations associated with software or executable code processed via the processor 64. In one embodiment, the display 72 may be a touch display capable of receiving inputs from a user of the computing system 60. The display 72 may also be used to view and analyze results of any analysis of the acquired seismic data to determine geological formations within the subsurface region 26, the location and/or properties of hydrocarbon deposits within the subsurface region 26, and/or the like. The display 72 may be any suitable type of display, such as a liquid crystal display (LCD), plasma display, or an organic light emitting diode (OLED) display. In addition to depicting the visualization described herein via the display 72, it may be noted that the computing system 60 may also depict the visualization via other tangible elements, such as paper (e.g., via printing), or the like.

With the foregoing in mind, the present techniques described herein may also be performed using a supercomputer employing multiple computing systems 60, a cloud-computing system, or the like to distribute processes to be performed across multiple computing systems. In this case, each computing system 60 operating as part of a super computer may not include each component listed as part of the computing system 60. For example, each computing system 60 may not include the display 72 since the display 72 may not be useful for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, or the like regarding the subsurface region 26.

Although the components described above have been discussed with regard to the computing system 60, it may be noted that similar components may make up the computing system 60. Moreover, the computing system 60 may also be part of the marine survey system 22 or the marine survey system 31, and thus may monitor and/or control certain operations of the seismic sources 32 or 40, the receivers 36, 44, 46, or the like. Further, it may be noted that the listed components are provided as example components, and the embodiments described herein are not to be limited to the components described with reference to FIG. 4.

In some embodiments, the computing system 60 (e.g., the processor 64 operating in conjunction with at least one of the memory 66 or the storage 68) may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that may extend for some distance. In a two-dimensional (2-D) seismic survey, the receiver locations may be placed along a single line, whereas, in a three-dimensional (3-D) survey, the receiver locations may be distributed across the surface in a grid pattern. As such, a 2-D seismic survey may provide a cross sectional picture (vertical slice) of Earth layers present directly beneath the recording locations. A 3-D seismic survey, on the other hand, may create a data "cube" or volume that may correspond to a 3-D picture of the subsurface region 26.

In addition, a four-dimensional (4-D) or time-lapse seismic survey may include seismic data acquired during a 3-D survey at multiple times. Using the different seismic images acquired at different times, the computing system 60 may compare the two images to identify changes in the subsurface region 26.

In any case, a seismic survey may include a large number of individual seismic recordings (e.g., seismic traces, traces). As such, the computing system 60 may analyze the acquired seismic data and obtain an image representative of the subsurface region 26. The computing system 60 may use the image to determine locations and/or properties of hydrocarbon deposits. To that end, a variety of seismic data processing algorithms may be used to remove noise from the acquired seismic data, migrate the pre-processed seismic data, identify shifts between multiple seismic images, align multiple seismic images, or the like.

After the computing system 60 analyzes the acquired seismic data, the results of the seismic data analysis (e.g., seismogram, seismic images, map of geological formations, etc.) may be used to perform various operations within the hydrocarbon exploration and production industries. In some embodiments, the computing system 60 may provide an indication of the presence of hydrocarbons. As such, the computing system 60 may provide an indication of the subsurface region 26 that is likely to have hydrocarbons and provide a position (e.g., coordinates or a relative area) of regions that include the hydrocarbon deposits and/or (in some cases) subsurface drilling hazards. In other embodiments, the image generated in accordance with the present techniques may be displayed via the display 72 of the computing system 60, thus facilitating locating a region by a user of the computing system 60. One technique utilized to acquire the seismic data used to provide a seismic data analysis is illustrated in FIG. 5.

Figure 5:
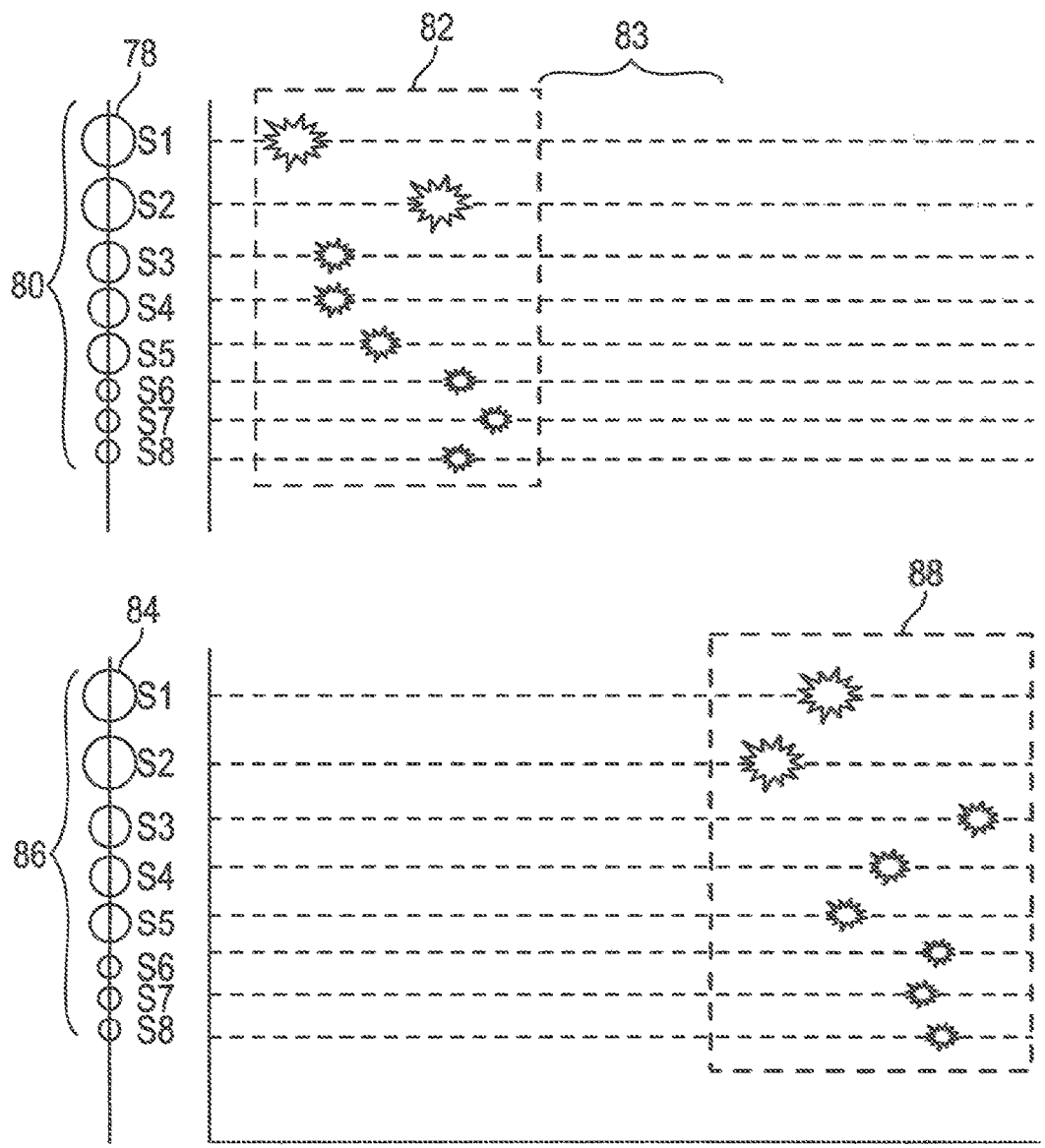
FIG. 5 illustrates a schematic of a technique of seismic acquisition, in accordance with embodiments presented herein.

FIG. 5 illustrates schematically an embodiment of a technique and system used in seismic acquisition. In general, the technique entails firing seismic sources 78 within a source array 80 according to a firing pattern 82. Thereafter, after a period of time 83, seismic sources 84 within a second source array 86 are fired according to a second firing pattern 88. In this manner, FIG. 5 illustrates a flip flop shooting technique or method in which one source array 80 is activated (i.e., one or more seismic sources 78 are activated), thereafter, after a period of time 83, the source array 86 is activated (i.e., one or more seismic sources 84 are activated), and thereafter, the process repeats.

It should be noted that each of the firing patterns 82 and 88 are presented for illustrative purposes only and should not be construed as limiting in any way. Moreover, it should be appreciated that while firing pattern 82 differs from firing pattern 88, in some embodiments, the firing of seismic sources 78 and 84 may be duplicated such that firing pattern 82 and firing pattern 88 are a common firing pattern. Likewise, the period of time 83 may be any suitable non-zero time period and may be varied or may remain consistent. When the period of time is varied, the variance can be random, pseudo-random, or according to a pattern.

As illustrated in FIG. 5, the seismic sources 78 and 84 (represented by S1 through S8) are air guns. As illustrated, S1 and S2 represent the same type of large volume air gun, S3 through S5 represent the same type of medium volume air gun, and S6 through S8 represent the same type of small volume airgun. However, it should be noted that any number, volume and type of seismic sources 78 and 84 may be included in each source array 80 and source array 86. For example, the seismic sources 78 may be high frequency sources while the seismic sources 84 are low frequency sources. Indeed, the seismic sources 78 may be any seismic source known to those of skill in the art. For example, one or more of the seismic sources 78 and 84 can be a source which repeatedly emits a single pulse of energy as opposed to a continuous sweep of energy, i.e., an impulsive seismic source. Examples of suitable impulsive seismic sources may include without limitation, air guns, gas guns, water guns, charges, explosives, combinations thereof, and the like. Likewise, other more continuous or non-impulsive sources might also be employed, such as without limitation, vibrators, resonators, sirens, and combinations thereof. Furthermore, it is noted that each of the source array 80 and the source array 86 may represent one of the seismic sources 32 of FIGS. 2 and 3.

The firing patterns 82 and 88 may be generated before a survey is undertaken. The firing patterns 82 and 88 can be loaded onto, for example, one or more controllers that control firing of the seismic sources 78 or 84. Alternatively, the firing patterns 82 and 88 generated in real time during the seismic survey by the one or more controllers. The one or more controllers can, for example, run code or other instructions stored in a memory via a processor of the controller to generate and/or implement the firing patterns 82 and 88. The one or more controllers can be located, for example, on the vessel 30 or may be disposed on or otherwise coupled to the source array 80 and the source array 86. The firing pattern 82 generally comprises a set of random time intervals or delays between the firing (activation) of each seismic source 78. Likewise, the firing pattern 88 generally comprises a set of random time intervals or delays between the firing (activation) of each seismic source 84. An algorithm or program may be used (e.g., by the controller) to generate firing patterns 82 and 88 and seismic signals acquired from these firing patterns 82 and 88 may be processed by any methods known to those of skill in the art.

The firing patterns 82 and 88 may be combined with any suitable simultaneous seismic sourcing or acquisition techniques known to those of skill in the art. Examples of simultaneous seismic shooting techniques include without limitation, independent simultaneous sourcing, self simultaneous sourcing with one or more sources/arrays, firing shots on pre-defined shot point positions (locations) with natural time dithering introduced by varying source boat speed, firing shots with pre-calculated random time dithering, or combinations thereof. In another embodiment, a plurality of arrays may be employed where a first source array 80 is shooting with firing patterns and at least a second source array 86 is shooting with either a self simultaneous sourcing method or with a conventional shooting technique (i.e. same or consistent time delays or period between firing patterns). The source array 80 and source array 86 may be synchronized or unsynchronized with one another. In other embodiments, firing patterns are not used. Instead, two or more source arrays 80 and 86 may be employed where each source array 80 and 86 may each be firing with alternative simultaneous seismic shooting techniques including without limitation, independent simultaneous sourcing, self simultaneous sourcing with one or more sources/arrays, firing shots on pre-defined shot point positions with natural time dithering introduced by varying source boat speed, firing shots with pre-calculated random time dithering, or combinations thereof.

In another exemplary embodiment, source array 80 may be shooting with firing patterns, and at least source array 86 (as well as one or more additional source arrays) may be shooting using an independent simultaneous sourcing technique, where all of the arrays may be synchronized, unsynchronized, random or pseudo-random with respect to one another. It is contemplated that any number of sources and/or source arrays may be used where each source and/or source array may be shooting with any combination of simultaneous sourcing or acquisition techniques such as without limitation, discrete firing patterns, continuous firing patterns, independent simultaneous sourcing, self simultaneous sourcing, or combinations thereof. When a plurality of sources or source arrays are used, each source or source array may also combine different simultaneous shooting techniques, if possible, such as firing patterns in conjunction with self simultaneous sourcing.

As illustrated in FIG. 5, the source arrays 80 and 86 are fired or activated independently of on another. Furthermore, each activation of a source array 80 and 86 may use a different firing pattern. The source arrays 80 and 86 may be coordinated/synchronized with another or unsynchronized. This is a variation of independent simultaneous sourcing. In yet another embodiment, for example, source array 80 may shoot with discrete firing patterns and a source array 86 may shoot with continuous firing patterns.

FIG. 6 illustrates marine seismic signal acquisition utilizing a first technique. As illustrated, the vessel 30 is towing two sources (i.e., source array 80 and source array 86, although single seismic sources can be utilized in place of either or both of source array 80 and source array 86) so as to improve the operation efficiency (i.e., to increase data density and/or reduce operation run time and cost. In the illustrated embodiment, the vessel 30 includes a controller 90 (described previously in conjunction with FIG. 5). The vessel 30 may be a portion of marine survey system 22 or marine survey system 31 (i.e., the marine seismic signal acquisition of FIG. 6 can be utilized in conjunction with marine survey system 22 and/or marine survey system 31).

The controller 90 may operate to generate and transmit a control signal to the source array 80 and/or the source array 86 to fire (i.e., for one or more of the seismic sources 78 and 84 therein to be fired), as discussed above in conjunction with FIG. 5. In some embodiments, the controller 90 may include a processor, an integrated circuit, or other electronic processing circuitry capable of executing computer-executable code or instructions to implement the methods described herein. The controller 90 can also include memory, storage, and/or other suitable articles of manufacture that can serve as media to store processor-executable code, data, or the like. These articles of manufacture may represent computer-readable media (e.g., any suitable form of memory or storage) that may store the processor-executable code used by the controller 90 processor 64 to perform the presently disclosed techniques.

Generally, the controller 90 may execute a software application and/or an algorithm to generate one or more control signals to control the operation (e.g., firing) of the source array 80 and/or source array 86. In other embodiments, individual controllers 90 can each be dedicated to a respective source array 80 and source array 86 to generate one or more control signals to control their respective operation. Furthermore, while only two source arrays 80 and 86 are illustrated, more than two sources or arrays may be utilized in conjunction with the techniques described herein (for example, as illustrated in conjunction with FIG. 8 described hereafter).

As illustrated, the vessel 30 tows source array 80 along a shot line 92 and the vessel 30 tows source array 86 along shot line 94. These shot lines 92 and 94 (and, accordingly, the source array 80 and the source array 86) may be a distance 95 apart, for example, 50 meters or another value. Source array 80 fires shots (e.g., at shot point positions 85, 87, 89, 91, and 93) each separated by a distance 96, for example, 25 meters. Likewise, source array 86 fires shots (e.g., at shot point positions 97, 99, 101, 103, and 105) also separated by a distance 96, for example, 25 meters. Furthermore, source array 86 can fire shots between the shots of source array 80, for example, shot point position 97 at a distance 98 from shot point position 85 of the source array 80. As illustrated, in the dual-source-array configuration this distance 98 may be the midpoint of distance 96, for example, 12.5 meters, although other values for distance 98 are contemplated especially when more than 2 source arrays are deployed. Likewise, source array 80 can fire shots between the shots of source array 86, for example, shot point position 87 at a distance 100 from the shot point position 97 of the source array 86. As illustrated, in the dual-source-array configuration this distance 100 may be the midpoint of distance 96, for example, 12.5 meters, although other values for distance 100 are contemplated.

The controller 90, for example, can control the distances 96, 98, and 100 through issuance of control signals causing the source arrays 80 and 86 to fire at desirable and/or predetermined times associated with desired and/or predetermined values for distances 96, 98, and 100. The controller 90 can generate the control signals in accordance with instructions loaded thereon or the control signals may be determined and generated in real time during the seismic survey by the controller 90.

In some embodiments, one or more of the shot point positions 85, 87, 89, 91, and 93 and the shot point positions 97, 99, 101, 103, and 105 are additionally dithered. That is, the controller 90 generates the control signals so that the actual position of one or more of the shot point positions 85, 87, 89, 91, 93, 97, 99, 101, 103, and 105 are adjusted by a small amount. This amount may be a fraction of a second, for example, between approximately negative 250 ms and positive 250 ms or another value typically less than one second and may cause the actual position of one or more of the shot point positions 85, 87, 89, 91, 93, 97, 99, 101, 103, and 105 to be moved at a distance 102 (i.e., Δx) from the illustrated locations of the shot point positions 85, 87, 89, 91, 93, 97, 99, 101, 103, and 105, whereby, for example, distance 102 is less than the distances 96, 98, and 100. The dithering of the actual position of one or more of the shot point positions 85, 87, 89, 91, 93, 97, 99, 101, 103, and 105 described above are varied and the variance can be random, pseudo-random, or according to a pattern.

FIG. 7 illustrates an inline (along shot line direction) section view of seismic data gathered (e.g., a common receiver gather) from the technique of FIG. 6. Graph 106 corresponds to seismic data from shot line 92 and graph 108 corresponds to seismic data from shot line 94. Likewise, data signals 110 or noise correspond to shots from sources 78 while data signals 112 or noise correspond to shots from sources 84. As previously described in conjunction with FIG. 6, when performing source acquisitions of seismic data, the seismic source array 80 transmits a first signal at a first time (corresponding to shot point position 87), the seismic source array 86 transmits a second signal at a second time (corresponding to shot point position 97), and the seismic source array 80 transmits a third signal at a third time (corresponding to shot point position 85), whereby the third time is at a time later than the second time and the second time is at a time later than the first time. As illustrated, time 115 is the recording time window starting from the shot time of respective shots. All seismic signals that travel back to the recording device within the time window are displayed in the figure. The value of time 115 may be any number. Hereby, in FIG. 7, time 115 is selected to be equal to the nominal time between any two shot points from a given line (e.g., shot point position 87 and shot point position 85), while time 113 is the time between a shot point from shot line 92 and the next shot point in time from line 94 (e.g., shot point position 97 and shot point position 85) excluding the variations introduced by the dithering of shot time.

Thus, although not outputted at the same time, the first signal at the first time (corresponding to shot point position 87, although not the first signal in the illustrated series) and the second signal at the second time (corresponding to shot point position 97) may be transmitted relatively close in time (at time 113), such that there is a possibility of non-noise signal interference during reception of the first signal by the reception of the second signal. Thus, sometimes at least a portion of the second signal is received by the seismic receivers 33 and/or 36 when the seismic receivers 33 and/or 36 are expecting to receive the first signal.

In this way, the data gathered corresponding to the first signal may include data corresponding to the second signal. If this occurs, the second signal showing up in the data for the first signal may be considered non-noise signal interference, weak-coherence signals, or blending noise. Since the second signal may be different (e.g., affected by different formations than the first signal) than the first signal, pre-emptively combining the two signals for data analysis may be improper and subsequently cause interference in the data recovered for the signal transmitted at the first time.

To help illustrate, a primary signal data (the portion of the data signal 110 in graph 106) may correspond to data gathered corresponding to the primary signal of multiple seismic source excitations (namely, shots at shot point positions 85, 87, 89, 91, and 93) that travel through one or more features inside earth and return to a seismic receiver. For example, the source array 80 may have transmitted the first signal at a first time, and, at a later time, the seismic receivers 33 and/or 36 may have received data corresponding to the first signal. Before the seismic receiver 33 and/or 36 completes recording the first signal, the source array 86 may transmit another signal and get recorded. The seismic receivers 33 and/or 36 may continue to record until at least a portion of the shots (e.g., some shots, many shots, all shots) have been recorded. Shifting the continuous recording to align the time zeros to the times of seismic source excitations may generate the gather data (commonly called a common receiver gather or a gather, but herein referred to as "gather") depicted in the graph 106.

Data gathered in graph 106 includes the primary signal data (e.g., the actual signal associated with the main response of the signal from the source array 80 and multiple excitations toward one or more features or formations being analyzed as part of the seismic data collection, coherent signal) and blending noise (the portion of data signal 112 in graph 106). The blending noise may overlap with relevant signal data that is relatively weak compared to the primary signal data.

Similarly, second primary signal data (the portion of the data signal 112 in graph 108) may correspond to data gathered corresponding to the primary signal of multiple seismic source excitations (namely, shots at shot point positions 97, 99, 101, 103, and 105) that travel through one or more features inside earth and return to a seismic receiver. Data gathered in graph 108 includes the second primary signal data (e.g., the actual signal associated with the main response of the signal from the source array 86 and multiple excitations toward one or more features or formations being analyzed as part of the seismic data collection, coherent signal) and second blending noise (the portion of data signal 110 in graph 108). The second blending noise may overlap with relevant signal data that is relatively weak compared to the second primary signal data.

Sometimes signal processing operations cause the discarding or disregarding of the blending noise and the second blending noise. However, it may not be desirable to ignore the blending noise and the second blending noise when isolating the primary signal and the second primary signal, respectively. To isolate the primary signal and the second primary signal, separation operations may be performed on the gather data. However, these separation operations may inadvertently cause at least a misallocation of the blending noise and the second blending noise. In this way, valuable seismic data that overlaps with the blending noise and the second blending noise may be lost when the blending noise and the second blending noise is misestimated.

The blending noise of graph 106 and the second blending noise of graph 108 illustrates examples of self simultaneous noise (i.e., due to the close proximity of source array 80 and source array 86 separated by distance 95). Deblending of the self simultaneous noise (SSN) tends to leave higher amount of residual noise (e.g., relative to independent simultaneous noise generated by other sources) due to weak coherence of signal overlapping with the SSS noise. To avoid SSS noise overlapping with target signals, alternative acquisition techniques may be employed and these techniques also operate to improve the deblending process relative to the technique outlined in conjunction with FIG. 6.

FIG. 8 illustrates a second technique of seismic acquisition in a marine environment utilizing the marine survey system 22 and/or the marine survey system 31. As illustrated, the vessel 30 is towing two sources (i.e., source array 80 and source array 86, although single seismic sources can be utilized in place of either or both of source array 80 and source array 86) so as to improve the operation efficiency (i.e., to increase data density and/or reduce operation run time and cost. In the illustrated embodiment, the vessel 30 includes the controller 90 (described previously in conjunction with FIGS. 5 and 6) that operates generate and transmit a control signal to the source array 80 and/or the source array 86 to fire (i.e., for one or more of the seismic sources 78 and 84 therein to be fired). In some embodiments, the controller 90 may include a processor, an integrated circuit, or other electronic processing circuitry capable of executing computer-executable code or instructions to implement the methods described herein. The controller 90 can also include memory, storage, and/or other suitable articles of manufacture that can serve as media to store processor-executable code, data, or the like. These articles of manufacture may represent computer-readable media (e.g., any suitable form of memory or storage) that may store the processor-executable code used by the controller 90 processor 64 to perform the presently disclosed techniques with respect to FIG. 8.

Generally, the controller 90 may execute a software application and/or an algorithm to generate one or more control signals to control the operation (e.g., firing) of the source array 80 and/or source array 86. In other embodiments, individual controllers 90 can each be dedicated to a respective source array 80 and source array 86 to generate one or more control signals to control their respective operation. Furthermore, while only two source arrays 80 and 86 are illustrated, more than two sources or arrays may be utilized in conjunction with the techniques described herein (as will be described in conjunction with FIGS. 11-13).

As illustrated, the vessel 30 tows source array 80 along a shot line 92 and the vessel 30 tows source array 86 along shot line 94. These shot lines 92 and 94 (and, accordingly, the source array 80 and the source array 86) may be a distance 95 apart, for example, 50 meters or another value. Source array 80 fires shots (e.g., at shot point positions 85, 87, 89, 91, and 93) each separated by a distance 96, for example, 25 meters. Likewise, source array 86 fires shots (e.g., at shot point positions 114, 116, 118, 120, and 122) also separated by a distance 96, for example, 25 meters. Furthermore, source array 86 can fire shots between the shots of source array 80, for example, shot point position 114 at a distance 98 modified by distance 124. That is, the marine survey system 22 and/or the marine survey system 31 can be initially set up to have the controller 90 generate shots at shot point positions 114, 116, 118, 120, and 122 that are not at a midpoint of distance 96. This distance 124 is be a fixed value, for example, approximately 1 meter, approximately 2 meters, approximately 3 meters, or another value or the distance 124 may approximately be between 1 meter and 4 meters, between 1 meter and 3 meters, between 1 meter and 2 meters, between 2 meters and 3 meters, between 2 meters and 4 meters, or another value. Alternatively, the distance 124 may be approximately 10%, 15%, 20%, 25%, 30%, 35%, 40%, 45%, 50%, 55%, 60%, 65%, 70%, 75%, 80%, 85%, 90%, 95% or 100% of distance 98 or approximately 10%, 15%, 20%, 25%, 30%, 35%, 40%, 45%, or 50% of distance 96.

The controller 90, for example, can control the distances 96, 98, 100, and 124 through issuance of control signals causing the source arrays 80 and 86 to fire at desirable and/or predetermined times associated with desired and/or predetermined values for distances 96, 98, 100, and 124. The controller 90 can generate the control signals in accordance with instructions loaded thereon or the control signals may be determined and generated in real time during the seismic survey by the controller 90. Indeed, as illustrated in FIG. 8, the controller 90 generates control signals that alter the timing of the shot point positions 114, 116, 118, 120, and 122 relative to the timing of the shot point positions 97, 99, 101, 103, and 105 (i.e., thus causing the shift in distance 124 for each of the shot point positions 114, 116, 118, 120, and 122). The shift in distance 124 of the actual position of one or more of the shot point positions 114, 116, 118, 120, and 122 described above may be varied and the variance can be random, pseudo-random, or according to a pattern; however, once shifted, the distance 124 remains fixed at least for a given shot line 94. It should be noted that movement of distance 124 may be positive or negative.

In some embodiments, one or more of the shot point positions 85, 87, 89, 91, and 93 and the shot point positions 114, 116, 118, 120, and 122 are additionally dithered. That is, the controller 90 generates the control signals so that the actual position of one or more of the shot point positions 85,

87, 89, 91, 93, 114, 116, 118, 120, and 122 are adjusted by a small amount. This amount may be a fraction of a second, for example, between approximately negative 250 ms and positive 250 ms or another value typically less than one second and may cause the actual position of one or more of the shot point positions 85, 87, 89, 91, 93, 114, 116, 118, 120, and 122 to be moved at a distance 102 (i.e., Δx) from the illustrated locations of the shot point positions 85, 87, 89, 91, 93, 114, 116, 118, 120, and 122, whereby, for example, distance 102 is less than the distances 96, 98, 100, and/or 124. The dithering of the actual position of one or more of the shot point positions 85, 87, 89, 91, 93, 114, 116, 118, 120, and 122 described above may be varied and the variance can be random, pseudo-random, or according to a pattern. Therefore, the overall shift illustrated in FIG. 8 includes both a dithered distance 102 (e.g., where the distance 102 is changing via a random, pseudo-random, or according to a pattern) and shifted distance 124 (e.g., where the distance 124 is fixed, at least for a given shot line 94), and the overall shift is no longer fixed for a given line when the dithered distance is included. An equivalent implementation of the concept is to shift the center of the dithered shot time by a fixed amount. For example, assuming it takes the source boat 30 time $t_{\_shift}$ to travel a distance of 124, dithering of shot time between negative 250 ms and positive 250 ms and fixed shot point position shift of distance 124 may be replaced by a dithering between −250 ms+$t_{\_shift}$ and 250 ms+$t_{\_shift}$ without explicit fixed shot point position shift. It should be noted that the shot position shift may applied to both shot line 92 and shot line 94, with different distances applied respectively.

FIG. 9 illustrates a third technique of seismic acquisition in a marine environment utilizing the marine survey system 22 and/or the marine survey system 31. As illustrated, the vessel 30 is towing two sources (i.e., source array 80 and source array 86, although single seismic sources can be utilized in place of either or both of source array 80 and source array 86) so as to improve the operation efficiency (i.e., to increase data density and/or reduce operation run time and cost. In the illustrated embodiment, the vessel 30 includes the controller 90 (described previously in conjunction with FIGS. 5, 6, and 8) that operates generate and transmit a control signal to the source array 80 and/or the source array 86 to fire (i.e., for one or more of the seismic sources 78 and 84 therein to be fired).

In some embodiments, the controller 90 may include a processor, an integrated circuit, or other electronic processing circuitry capable of executing computer-executable code or instructions to implement the methods described herein. The controller 90 can also include memory, storage, and/or other suitable articles of manufacture that can serve as media to store processor-executable code, data, or the like. These articles of manufacture may represent computer-readable media (e.g., any suitable form of memory or storage) that may store the processor-executable code used by the controller 90 processor 64 to perform the presently disclosed techniques with respect to FIG. 9.

Generally, the controller 90 may execute a software application and/or an algorithm to generate one or more control signals to control the operation (e.g., firing) of the source array 80 and/or source array 86. In other embodiments, individual controllers 90 can each be dedicated to a respective source array 80 and source array 86 to generate one or more control signals to control their respective operation. Furthermore, while only two source arrays 80 and 86 are illustrated, more than two sources or arrays may be utilized in conjunction with the techniques described herein.

As illustrated, the vessel 30 tows source array 80 along a shot line 92 and the vessel 30 tows source array 86 along shot line 94. These shot lines 92 and 94 (and, accordingly, the source array 80 and the source array 86) may be a distance 95 apart, for example, 50 meters or another value. As additionally illustrated, source array 86 may be horizontally offset by a distance 126 from the position of source array 80 (i.e., the source array 80 is be disposed at a first horizontal distance from the vessel 30 and the source array 86 is disposed at a second horizontal distance from the vessel 30, whereby a difference in the first horizontal distance and the second horizontal distance is distance 126). That is, the marine survey system 22 and/or the marine survey system 31 can be initially set up to have the source array 80 and the source array 86 offset from one another along the direction vessel 30 at a distance 126 to generate asymmetric geometry of the marine survey system 22 and/or the marine survey system 31. This distance 126 is be a fixed value, for example, approximately 1 meter, approximately 2 meters, approximately 3 meters, or another value or the distance 126 may approximately be between 1 meter and 4 meters, between 1 meter and 3 meters, between 1 meter and 2 meters, between 2 meters and 3 meters, between 2 meters and 4 meters, or another value. Alternatively, the distance 126 may be approximately 10%, 15%, 20%, 25%, 30%, 35%, 40%, 45%, 50%, 55%, 60%, 65%, 70%, 75%, 80%, 85%, 90%, 95% or 100% of distance 98 or approximately 10%, 15%, 20%, 25%, 30%, 35%, 40%, 45% or 50% of distance 96.

Source array 80 fires shots (e.g., at shot point positions 85, 87, 89, 91, and 93) each separated by a distance 96, for example, 25 meters. Likewise, source array 86 fires shots (e.g., at shot point positions 97, 99, 101, 103, and 105) also separated by a distance 96, for example, 25 meters. Furthermore, source array 86 can fire shots between the shots of source array 80, for example, shot point position 97 at a distance 98 from shot point position 85 of the source array 80. However, while the shot point position 85 matches that described with respect to FIG. 6 (i.e., the controller 90 generates and transmits control signals in a manner similar to that described above with respect to FIG. 6), the physical location of the source array 86 is offset by the distance 126 relative to the physical location of the source array 86 as described in FIG. 6. This offset alters the data generated by the acquisition technique in FIG. 9 relative to the data generated in FIG. 6, as will be discussed below with respect to FIGS. 10 and 11. It should be noted that the offset (e.g., distance 126) may be positive or negative. It should also be noted that the offset is relative position between source array 80 array and source array 86, both source array 80 and source array 86 may be offset by any given distances, but their relative position is what matters on the data pattern as to be discussed below with respect to FIGS. 10 and 11.

That is, the marine survey system 22 and/or the marine survey system 31 can be initially set up to have the controller 90 generate shots at shot point positions 97, 99, 101, 103, and 105, however, due to the distance 126 offset of source array 86, the data collected will not be representative of data from a midpoint of distance 96. The controller 90, for example, can control the distances 96, 98, and 100 and distance 126 can be a predetermined distance that is generated via alteration of a length of tether 128 relative to tether 130 and/or via alteration of the relative position of sources 84/sub-arrays within the source array 86. For example, a winch or other mechanism may be employed to alter the length of tether 128. The controller 90 (or another control mechanism) can operate to control the winch or other mechanism to adjust the length of the tether 128 to a fixed length. Alternatively, a tether 128 having a length that creates the distance 126 can instead be utilized. A fastener or other connection device may be disposed on or may be part of the source array 86 to couple the tether 128 to the source array 86.

Furthermore, as will be discussed in greater detail with respect to FIGS. 12 and 13, in the case of more than two seismic source arrays being towed by the same vessel 30, different shifts can be applied to each of the multiple source arrays to produce stronger incoherency of blending noise (i.e., the same shift in distance and/or time need not need be applied to each source array being towed to create more randomness and incoherency of blending noise). The different shifts applied to each of the source arrays (e.g., shot point positions) may be considered as spatial coding that determines the pattern of blending noise. Every sail line/sequence may share the same spatial code or adopt different spatial codes for each sail line/sequence. Additionally, the controller 90 can generate the control signals in accordance with instructions loaded thereon or the control signals may be determined and generated in real time during the seismic survey by the controller 90.

In some embodiments, one or more of the shot point positions 85, 87, 89, 91, and 93 and the shot point positions 97, 99, 101, 103, and 105 are additionally dithered. That is, the controller 90 generates the control signals so that the actual position of one or more of the shot point positions 85, 87, 89, 91, 93, 97, 99, 101, 103, and 105 are adjusted by a small amount. This amount may be a fraction of a second, for example, between approximately negative 250 ms and positive 250 ms or another value typically less than one second and may cause the actual position of one or more of the shot point positions 85, 87, 89, 91, 93, 97, 99, 101, 103, and 105 to be moved at a distance 102 (i.e., $\Delta x$) from the illustrated locations of the shot point positions 85, 87, 89, 91, 93, 97, 99, 101, 103, and 105, whereby, for example, distance 102 is less than the distances 96, 98, and 100. The dithering of the actual position of one or more of the shot point positions 85, 87, 89, 91, 93, 97, 99, 101, 103, and 105 described above may be varied and the variance can be random, pseudo-random, or according to a pattern. Therefore, the overall shift illustrated in FIG. 9 includes both a dithered distance 102 (e.g., where the distance 102 is changing via a random, pseudo-random, or according to a pattern) and shifted distance 126 (e.g., where the distance 126 is fixed, at least for a given shot line 94).

Figure 10:
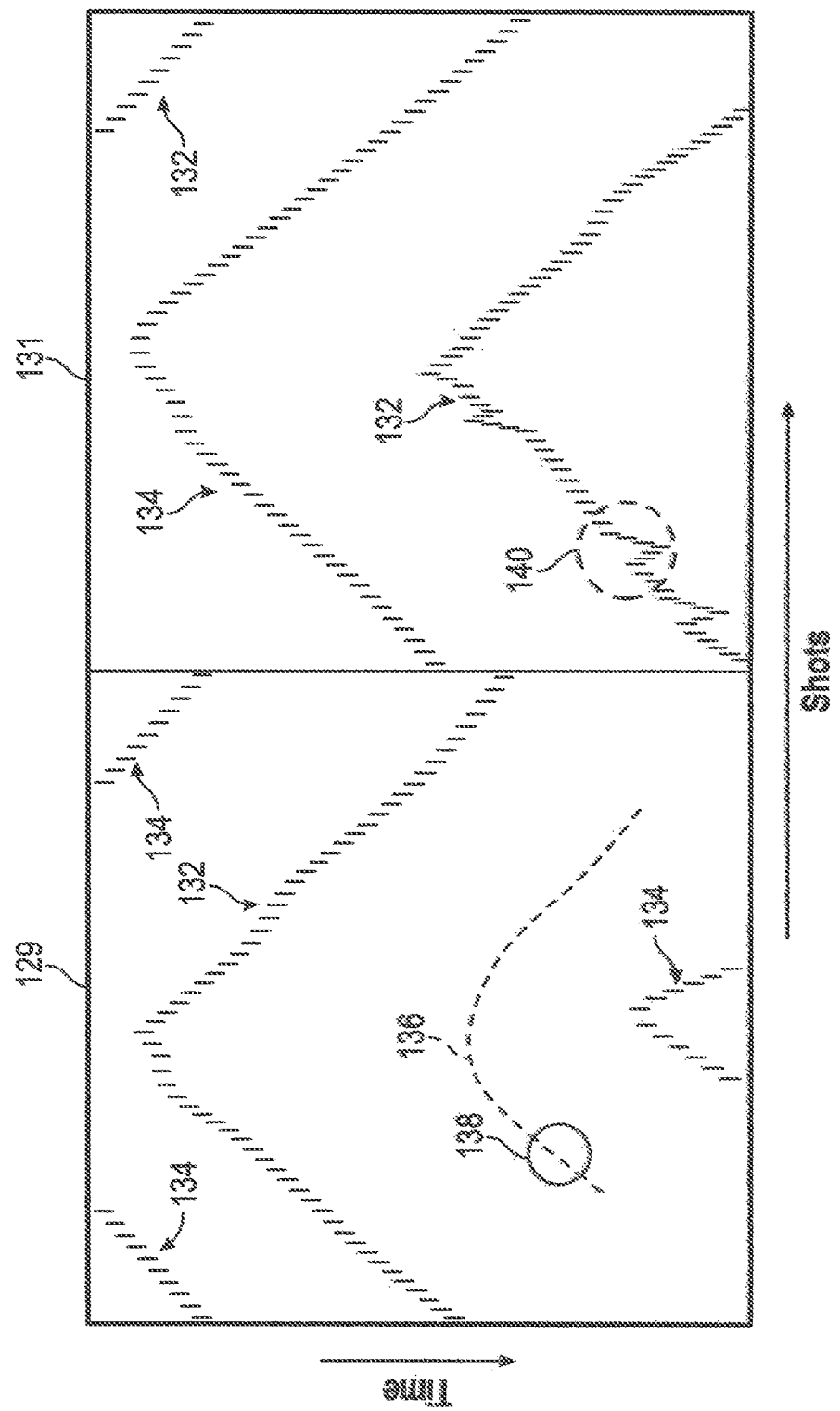
FIG. 10 illustrates an inline section view of seismic data gathered from the technique of FIG. 8 or FIG. 9, in accordance with embodiments presented herein.

FIG. 10 illustrates an inline (along a shot line direction) section view of seismic data gathered (e.g., a common receiver gather) from the technique of FIG. 8 or FIG. 9, or the combination of FIG. 8 and FIG. 9. Graph 129 corresponds to seismic data from shot line 92 and graph 131 corresponds to seismic data from shot line 94. Likewise, data signals 132 or noise correspond to shots from sources 78 while data signals 134 correspond to shots from sources 84. As described in conjunction with FIGS. 8 and 9, when performing source acquisitions of seismic data, the seismic source array 80 transmits a first signal at a first time (corresponding to shot point position 87, although not the first signal in the illustrated series) and the seismic source array 86 transmits a second signal at a second time (corresponding to shot point position 114 or shot point position 97 with a modified location of the source array 86 by the distance 126 and shot time dithering between, for example, −500 ms and +500 ms).

Thus, although not outputted at the same time, the first signal at the first time (corresponding to shot point position 87) and the second signal at the second time (corresponding to shot point position 97 or 114) may be transmitted relatively close in time such that there is a possibility of non-noise signal interference during reception of the first signal by the reception of the second signal. Thus, sometimes at least a portion of the second signal is received by the seismic receivers 33 and/or 36 when the seismic receivers 33 and/or 36 are expecting to receive the first signal.

In this way, the data gathered corresponding to the first signal may include data corresponding to the second signal. As illustrated in FIG. 10, the primary signal data (the portion of the data signal 132 in graph 129) may correspond to data gathered corresponding to the primary signal of multiple seismic source excitations (namely, shots at shot point positions 85, 87, 89, 91, and 93) that travel through one or more features inside earth and return to a seismic receiver. Graph 129 also includes blending noise (the portion of data signal 134 in graph 129). However, in contrast to FIG. 7, the blending noise in graph 129 does not overlap with relevant signal data 136 (i.e., weak signal data as a portion of data signal 132 that is relatively weak compared to the primary signal data).

Indeed, through the use of the shifting techniques described in conjunction with each of FIGS. 8 and 9, the blending noise has moved generally downwards in graph 129 and upwards in graph 131 (with a remainder portion above data signal 132 in graph 129 and above data signal 134 in graph 131) so that the blending noise, while still present, no longer conflicts with the relevant signal data 136. Accordingly, the relevant signal data 136 can be utilized in conjunction with the primary signal data to improve generated seismic models. Additionally, due to the removal of the blending noise from the location of the relevant signal data, deblending operations may be greatly improved, as the data to be deblended is simplified relative to the data in FIG. 7.

For example, the relevant signal data 136 can be utilized to remove second blending noise present in graph 131. Data gathered in graph 131 includes second primary signal data (e.g., the portion of the data signal 134 in graph 129 which is the actual signal associated with the main response of the signal from the source array 86 and multiple excitations toward one or more features or formations being analyzed as part of the seismic data collection, coherent signal) and second blending noise (the portion of data signal 132 in graph 131). The second blending noise may overlap with relevant signal data that is relatively weak compared to the second primary signal data. However, the relevant signal data 136 can be applied to remove the second blending noise more effectively in a deblending operation due to the 3D continuity in the crossline direction (perpendicular to shot line direction).

For example, relevant signal data 136 at location 138 can be used in the deblending process to remove second blending noise at location 140 of the second blending noise. This will allow for a deblending operation that will be able to extract the relevant signal data that is relatively weak compared to the second primary signal data more easily and thoroughly, since the relevant second data at location 140 corresponds to the known relevant signal data 136 at location 138 (i.e. the known relevant signal data 136 at location 138 provides a reference for the second blending noise at location 140, as the relevant signal data 136 at location 138 and the relevant signal data at location 140 are supposed to be coherent while the shots are sorted into 3D or higher dimension geometry). In a similar manner, the relevant signal data in graph 131 will provide a reference to effectively separate the blending noise (the portion of the data signal 134 in graph 129). Graphs 128 and 130 no longer have the same noise pattern (unlike graphs 106 and 108), which makes the deblending much easier once the data is sorted in 3D (or higher dimension).

The coded interleaving techniques described in conjunction with each of FIGS. 8 and 9 also allow us to control what portion of weak primary signals to be overlapped with the strong blending noise. It gives us the flexibility such that the important part of the signals (e.g. the data used to image subsurface hydrocarbon reservoir) will not be contaminated by blending noise or the contamination is minimized.

Figure 11:
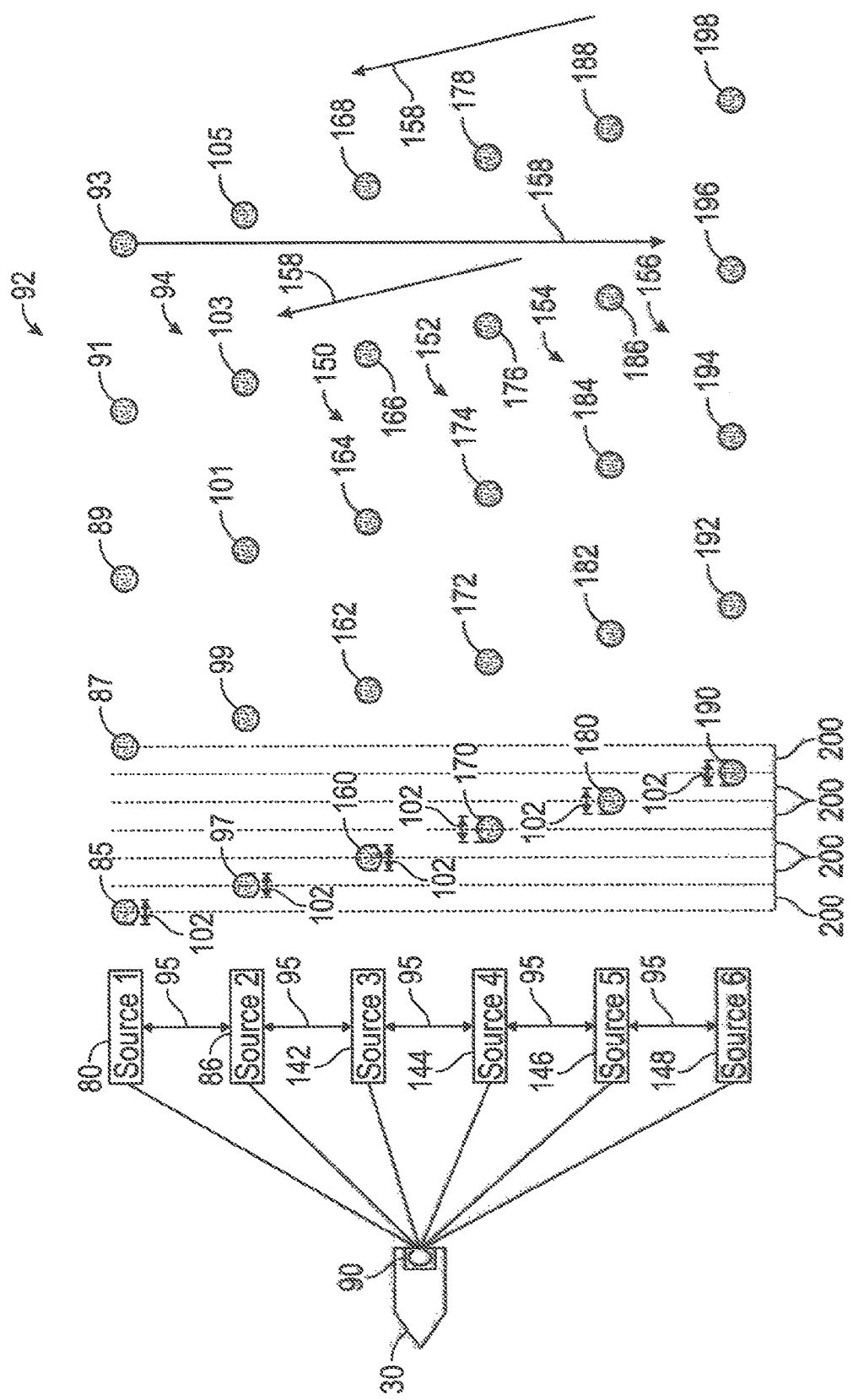
FIG. 11 illustrates a fourth technique of seismic acquisition in a marine environment utilizing the marine survey system of FIG. 2 or the second marine survey system of FIG. 3, in accordance with embodiments presented herein.

As previously noted, multiple source arrays may be utilized in conjunction with present techniques. For example, FIG. 11 illustrates a fourth technique of seismic acquisition in a marine environment utilizing the marine survey system 22 and/or the marine survey system 31. As illustrated, the vessel 30 is towing six sources (i.e., source array 80 and source array 86, along with source array 142, source array 144, source array 146, and source array 148 (although single seismic sources can be utilized in place of one or more of source array 80, source array 86, source array 142, source array 144, source array 146, and source array 148) so as to improve the operation efficiency (i.e., to increase data density and/or reduce operation run time and cost. In the illustrated embodiment, the vessel 30 includes a controller 90 that operates to generate and transmit a control signal to the source array 80, the source array 86, the source array 142, the source array 144, the source array 146, and/or the source array 148 to fire (i.e., for one or more of the seismic sources 78 and 84, or other associated seismic sources therein to be fired), as discussed above in conjunction with FIG. 5.

Generally, the controller 90 may execute a software application and/or an algorithm to generate one or more control signals to control the operation (e.g., firing) of the source array 80, the source array 86, the source array 142, the source array 144, the source array 146, and/or the source array 148. In other embodiments, individual controllers 90 can each be dedicated to a respective source array 80, source array 86, source array 142, source array 144, source array 146, and source array 148 to generate one or more control signals to control their respective operation.

As illustrated, the vessel 30 tows source array 80 along a shot line 92 and the vessel 30 tows source array 86 along shot line 94. The vessel 30 also tows source array 142 along a shot line 150, source array 144 along a shot line 152, source array 146 along shot line 154, and source array 148 along shot line 156. These shot lines 92, 94, 150, 152, 154, and 156 (and, accordingly, the source array 80, the source array 86, the source array 142, the source array 144, the source array 146, and/or the source array 148) may be a distance 95 apart, for example, 50 meters or another value and may be, for example, disposed in any azimuthal direction, not just in a (horizontal) direction along a sail line of the vessel 30. The source array 80, the source array 86, the source array 142, the source array 144, the source array 146, and the source array 148 can fire shots in conjunction with the shot sequence 158. Additionally, source array 80 fires shots (e.g., at shot point positions 85, 87, 89, 91, and 93) each separated by a distance, for example, 25 meters. Likewise, source array 86 fires shots (e.g., at shot point positions 97, 99, 101, 103, and 105) also separated by a distance, for example, 25 meters. Similarly, each of the source array 142, the source array 144, the source array 146, and the source array 148 fires shots (e.g., respectively at shot point positions 160, 162, 164, 166, and 168, shot point positions 170, 172, 174, 176, and 178, shot point positions 180, 182, 184, 186, and 188, and shot point positions 190, 192, 194, 196, and 198).

Furthermore, as illustrated via the shot sequence 158, each of the source array 86, the source array 142, the source array 144, the source array 146, and the source array 148 fires shots between the shots of source array 80. Similarly, each of the source array 80, the source array 142, the source array 144, the source array 146, and the source array 148 fires shots between the shots of source array 86. This pattern continues for the remaining source array 142, source array 144, source array 146, and source array 148. The shots fires in conjunction with shot sequence 158 can are separated by a distance 200. In some embodiments, this distance 200 is the total distance between two shots from a source array along its shot path, for example, source array 80 along its shot line 92, divided by the total number of towed source arrays, for example, as illustrated, six source arrays 80, 86, 142, 144, 146, and 148 (although other values and distances for distance 200 are contemplated).

The controller 90, for example, can control the distances between shots on each of the shot lines 92, 94, 150, 152, 154, and 156 through issuance of control signals causing the source arrays 80, 86, 142, 144, 146, and 148 to fire at desirable and/or predetermined times associated with desired and/or predetermined values for distances between shots (of a shot line, for example, shot line 92) and for distance 200. The controller 90 can generate the control signals in accordance with instructions loaded thereon or the control signals may be determined and generated in real time during the seismic survey by the controller 90.

In some embodiments, one or more of the shot point positions 85, 87, 89, 91, and 93, 97, 99, 101, 103, and 105, 160, 162, 164, 166, and 168, 170, 172, 174, 176, and 178, 180, 182, 184, 186, and 188, and 190, 192, 194, 196, and 198 are additionally dithered. That is, the controller 90 generates the control signals so that the actual position of one or more of the shot point positions 85, 87, 89, 91, 93, 97, 99, 101, 103, 105, 160, 162, 164, 166, 168, 170, 172, 174, 176, 178, 180, 182, 184, 186, 188, 190, 192, 194, 196, and 198 are adjusted by a small amount. This amount may be a fraction of a second, for example, between approximately negative 250 ms and positive 250 ms or another value typically less than one second and may cause the actual position of one or more of the shot point positions 85, 87, 89, 91, 93, 97, 99, 101, 103, and 105 to be moved at a distance 102 (i.e., $\Delta x$) from the illustrated locations of the shot point positions 85, 87, 89, 91, 93, 97, 99, 101, 103, 105, 160, 162, 164, 166, 168, 170, 172, 174, 176, 178, 180, 182, 184, 186, 188, 190, 192, 194, 196, and 198, whereby, for example, distance 102 is less than the distance 200 and the distances between shots (of a given shot line, for example, shot line 92). The dithering of the actual position of one or more of the shot point positions 85, 87, 89, 91, 93, 97, 99, 101, 103, 105, 160, 162, 164, 166, 168, 170, 172, 174, 176, 178, 180, 182, 184, 186, 188, 190, 192, 194, 196, and 198 described above are varied and the variance can be random, pseudo-random, or according to a pattern.

Figure 12:
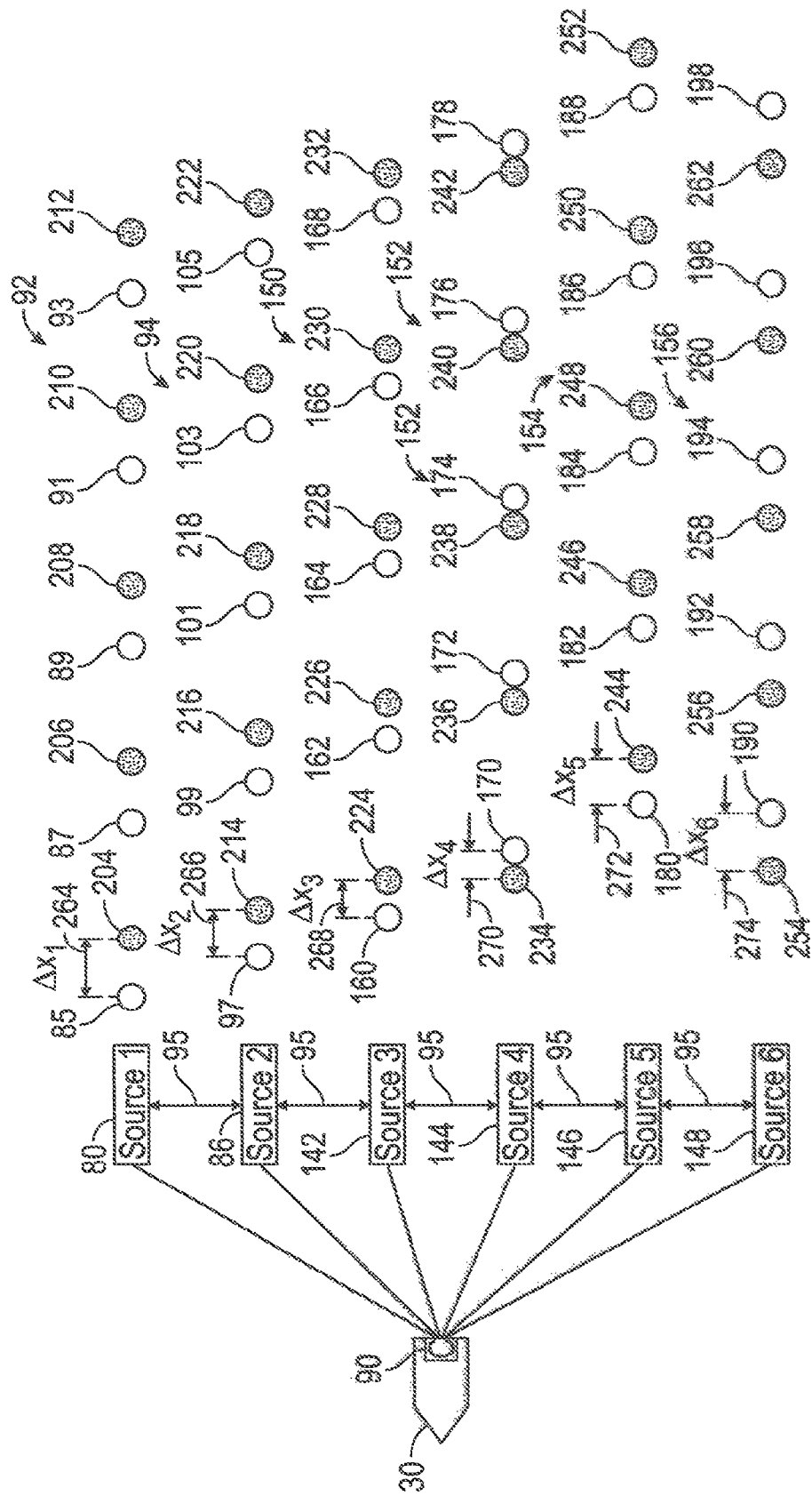
FIG. 12 illustrates a fifth technique of seismic acquisition in a marine environment utilizing the marine survey system of FIG. 2 or the second marine survey system of FIG. 3, in accordance with embodiments presented herein.

FIG. 12 illustrates a fifth technique of seismic acquisition in a marine environment utilizing the marine survey system 22 and/or the marine survey system 31. As illustrated, the vessel 30 is towing six sources (i.e., source array 80, source arrays 86, source array 142, source array 144, source array 146, and source array 148, although single seismic sources can be utilized in place of one or more of source arrays 80, 86, 142, 144, 146, and 148) so as to improve the operation efficiency (i.e., to increase data density and/or reduce operation run time and cost.

In the illustrated embodiment, the vessel 30 includes a controller 90 that operates to generate and transmit a control signal to the source array 80, the source array 86, the source array 142, the source array 144, the source array 146, and/or the source array 148 to fire (i.e., for one or more of the seismic sources 78 and 84, or other associated seismic sources therein to be fired), as discussed above in conjunction with FIG. 5. Generally, the controller 90 may execute a software application and/or an algorithm to generate one or more control signals to control the operation (e.g., firing) of the source array 80, the source array 86, the source array 142, the source array 144, the source array 146, and/or the source array 148. In other embodiments, individual controllers 90 can each be dedicated to a respective source array 80, source array 86, source array 142, source array 144, source array 146, and source array 148 to generate one or more control signals to control their respective operation.

As illustrated, the vessel 30 tows source array 80 along a shot line 92 and the vessel 30 tows source array 86 along shot line 94. The vessel 30 also tows source array 142 along a shot line 150, source array 144 along a shot line 152, source array 146 along shot line 154, and source array 148 along shot line 156. These shot lines 92, 94, 150, 152, 154, and 156 (and, accordingly, the source array 80, the source array 86, the source array 142, the source array 144, the source array 146, and/or the source array 148) may be a distance 95 apart, for example, 50 meters or another value. The source array 80, the source array 86, the source array 142, the source array 144, the source array 146, and the source array 148 can fire shots in conjunction with a shot sequence. Source array 80 fires shots at shot point positions 204, 206, 208, 210, and 212, which are each adjusted at a distance 264 (i.e., $\Delta x_1$) relative to respective shot point positions 85, 87, 89, 91, and 93). Each of the shot point positions 204, 206, 208, 210, and 212 can be separated by a distance, for example, 25 meters. Likewise, source array 86 fires shots (e.g., at shot point positions 214, 216, 218, 220, and 222, which are each adjusted at a distance 266 (i.e., $\Delta x_2$) relative to respective shot point positions 97, 99, 101, 103, and 105) also separated by a distance, for example, 25 meters. Similarly, each of the source array 142, the source array 144, the source array 146, and the source array 148 fires shots respectively at shot point positions 224, 226, 228, 230, and 232 (each adjusted at a respective distance 268 (i.e., $\Delta x_3$) relative to shot point positions 160, 162, 164, 166, and 168), shot point positions 234, 236, 238, 240, and 242 (each adjusted at a respective distance 270 (i.e., $\Delta x_4$) relative to shot point positions 170, 172, 174, 176, and 178), shot point positions 244, 246, 248, 250, and 252 (each adjusted at a respective distance 272 (i.e., $\Delta x_5$) relative to shot point positions 180, 182, 184, 186, and 188), and shot point positions 254, 256, 258, 260, and 262 (each adjusted at a respective distance 274 (i.e., $\Delta x_6$) relative to shot point positions 190, 192, 194, 196, and 198).

In this manner, each of the source array 86, the source array 142, the source array 144, the source array 146, and the source array 148 fires shots between the shots of source array 80. However, the shot sequence may differ from the shot sequence 158 represented in FIG. 11. For example, subsequent to a shot by the source array 80 at shot point position 206, a shot may be fired by the source array 144 at shot point position 236. Thereafter, a shot may be fired by the source array 146 at shot point position 244. Subsequently, a shot may be fired by the source array 142 at shot point position 224, a shot may be fired by the source array 148 at shot point position 254, and a shot may be fired by the source array 86 at shot point position 214. This shot sequence illustrates that distance 264 (i.e., $\Delta x_1$), distance 266 (i.e., $\Delta x_2$), distance 268 (i.e., $\Delta x_3$), distance 270 (i.e., $\Delta x_4$), distance 272 (i.e., $\Delta x_5$), and distance 274 (i.e., $\Delta x_6$) can each be positive or negative. The shot sequence pattern used can continue for the remaining source arrays 86, 142, 144, 146, and 148. Additionally one or more of the distances 264, 266, 268, 270, 272, or 274 can be altered (i.e., variable or varied based on a selection controlled, for example, via controller 90), which results in a new shot sequence pattern that can be repeated thereafter in a manner similar to that described above.

In other embodiments, one or more of the distances 264, 266, 268, 270, 272, or 274 can also be zero (i.e., unshifted). Likewise, one or more of the distances 264, 266, 268, 270, 272, or 274 can be a fixed value, for example, approximately 1 meter, approximately 2 meters, approximately 3 meters, or another value (in either a positive or negative direction with respect to the vessel 30, i.e., towards or away from the vessel 30) or the distance 124 may approximately be between 1 meter and 4 meters, between 1 meter and 3 meters, between 1 meter and 2 meters, between 2 meters and 3 meters, between 2 meters and 4 meters, or another value (in either a positive or negative direction with respect to the vessel 30, i.e., towards or away from the vessel 30). Alternatively, the distance 124 may be approximately 10%, 15%, 20%, 25%, 30%, 35%, 40%, 45%, 50%, 55%, 60%, 65%, 70%, 75%, 80%, 85%, 90%, 95% or 100% of the distance between shots of a shot line, for example, shot line 92 or approximately 10%, 15%, 20%, 25%, 30%, 35%, 40%, 45%, or 50% of the distance between shots of a shot line, for example, shot line 92.

As previously noted, the controller 90, for example, can control the distances 264, 266, 268, 270, 272, and 274 through issuance of control signals causing the source arrays 80, 86, 142, 144, 146, and 148 to fire at desirable and/or predetermined times associated with desired and/or predetermined values for distances 264, 266, 268, 270, 272, and 274. The controller 90 can generate the control signals in accordance with instructions loaded thereon or the control signals may be determined and generated in real time during the seismic survey by the controller 90. Indeed, as illustrated in FIG. 12, the controller 90 generates control signals that alter the timing of the shot point positions of the shot lines 92, 94, 150, 152, 154, and 156 relative to the timing of the shot point positions 85, 87, 89, 91, 93, 97, 99, 101, 103, 105, 160, 162, 164, 166, 168, 170, 172, 174, 176, 178, 180, 182, 184, 186, 188, 190, 192, 194, 196, and 198 of FIG. 11 and additionally illustrated for reference only in FIG. 12. In this manner, the controller 90 causes, for example, the shift in distances 264, 266, 268, 270, 272, and 274 for each of the shot point positions 204, 214, 224, 234, 244, and 254). The shift in distances 264, 266, 268, 270, 272, and 274 of the actual position of one or more of the shot point positions 204, 214, 224, 234, 244, and 254 described above may be varied and the variance can be random, pseudo-random, or according to a pattern; however, once shifted, the distances 264, 266, 268, 270, 272, and 274 remain fixed at least for a given shot line 94.

In some embodiments, one or more of the shot point positions 204, 206, 208, 210, and 212, shot point positions 214, 216, 218, 220, and 222, shot point positions 224, 226, 228, 230, and 232, shot point positions 234, 236, 238, 240, and 242, shot point positions 244, 246, 248, 250, and 252, and shot point positions 254, 256, 258, 260, and 262 are additionally dithered. That is, the controller 90 generates the control signals so that the actual position of one or more of the shot point positions 204, 206, 208, 210, 212, 214, 216, 218, 220, 222, 224, 226, 228, 230, 232, 234, 236, 238, 240, 242, 244, 246, 248, 250, 252, 254, 256, 258, 260, and 262 are adjusted by a small amount. This amount may be a fraction of a second, for example, between approximately negative 250 ms and positive 250 ms or another value typically less than one second and may cause the actual position of one or more of the shot point positions 204, 206, 208, 210, 212, 214, 216, 218, 220, 222, 224, 226, 228, 230, 232, 234, 236, 238, 240, 242, 244, 246, 248, 250, 252, 254, 256, 258, 260, and 262 to be moved at a distance 102 (i.e., $\Delta x$) from the illustrated locations of the shot point positions 204, 206, 208, 210, 212, 214, 216, 218, 220, 222, 224, 226, 228, 230, 232, 234, 236, 238, 240, 242, 244, 246, 248, 250, 252, 254, 256, 258, 260, and 262 whereby, for example, distance 102 is less than the distances 264, 266, 268, 270, 272, and 274.

The dithering of the actual position of one or more of the shot point positions 204, 206, 208, 210, 212, 214, 216, 218, 220, 222, 224, 226, 228, 230, 232, 234, 236, 238, 240, 242, 244, 246, 248, 250, 252, 254, 256, 258, 260, and 262 described above may be varied and the variance can be random, pseudo-random, or according to a pattern. Therefore, the overall shift illustrated in FIG. 12 includes both a dithered distance 102 (e.g., where the distance 102 is changing via a random, pseudo-random, or according to a pattern) and shifted distances 264, 266, 268, 270, 272, and 274 (e.g., where the distances 264, 266, 268, 270, 272, and 274 are fixed, at least for a given shot line, for example, shot line 94), and the overall shift is no longer fixed for a given line when the dithered distance is included. An equivalent implementation of the concept is to shift the center of the dithered shot time by a fixed amount. For example, assuming it takes the source boat 30 time $t_{shift}$ to travel, for example, distance 124, dithering of shot time between negative 250 ms and positive 250 ms and fixed shot point position shift of distance 124 may be replaced by a dithering between $-250$ ms+$t_{shift}$ and 250 ms+$t_{shift}$ without explicit fixed shot point position shift. It should be noted that the shot position shift may applied to shot lines 92, 94, 150, 152, 154, and 156 with different distances applied respectively. This offset alters the data generated by the acquisition technique in FIG. 12 relative to the data generated in FIG. 11, as was previously discussed with respect to FIG. 10.

Figure 13:
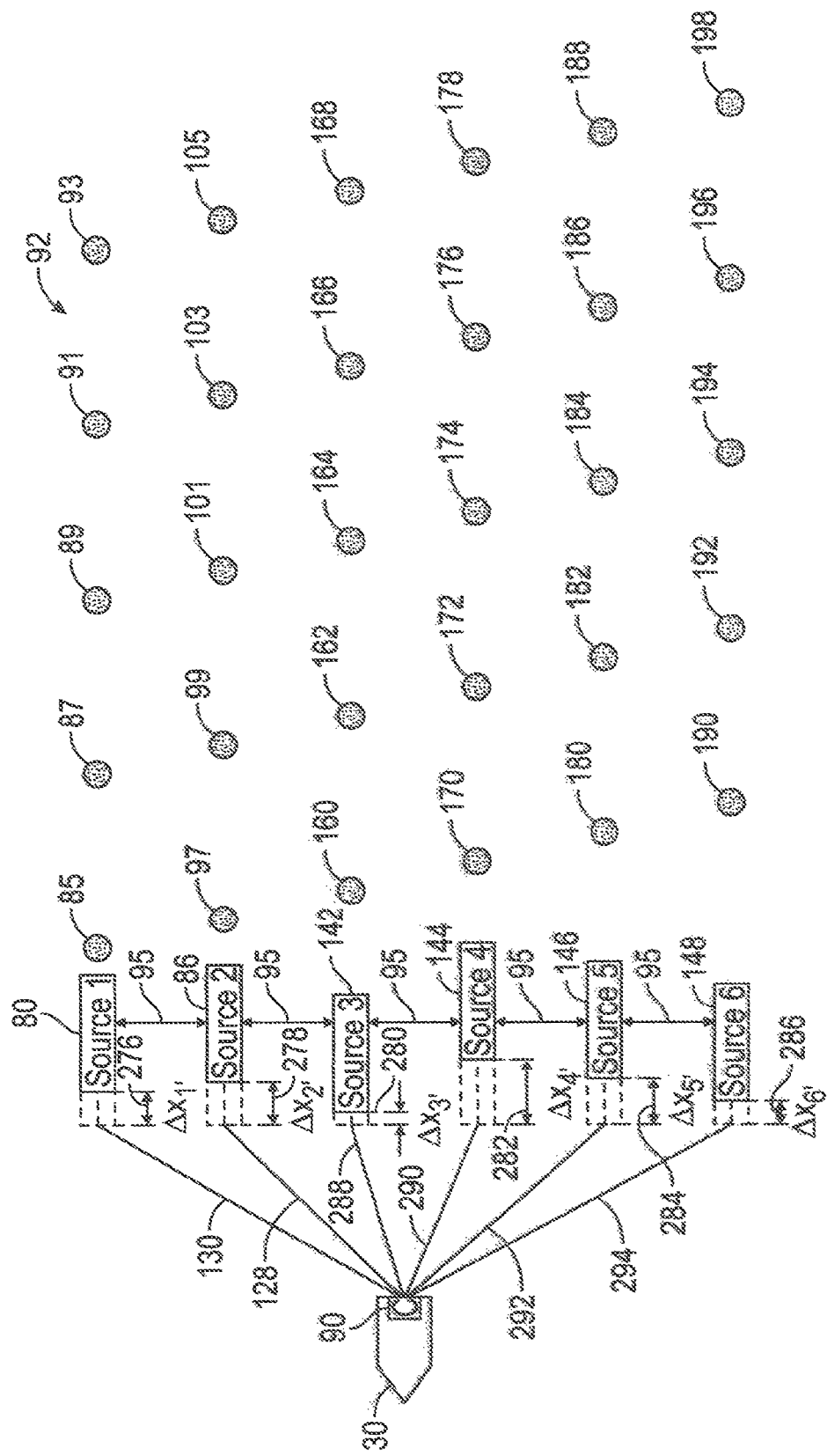
FIG. 13 illustrates a sixth technique of seismic acquisition in a marine environment utilizing the marine survey system of FIG. 2 or the second marine survey system of FIG. 3, in accordance with embodiments presented herein.

FIG. 13 illustrates a sixth technique of seismic acquisition in a marine environment utilizing the marine survey system 22 and/or the marine survey system 31. As illustrated, the vessel 30 is towing six sources (i.e., source array 80, source arrays 86, source array 142, source array 144, source array 146, and source array 148, although single seismic sources can be utilized in place of one or more of source arrays 80, 86, 142, 144, 146, and 148) so as to improve the operation efficiency (i.e., to increase data density and/or reduce operation run time and cost.

In the illustrated embodiment, the vessel 30 includes a controller 90 that operates to generate and transmit a control signal to the source array 80, the source array 86, the source array 142, the source array 144, the source array 146, and/or the source array 148 to fire (i.e., for one or more of the seismic sources 78 and 84, or other associated seismic sources therein to be fired), as discussed above in conjunction with FIG. 5. Generally, the controller 90 may execute a software application and/or an algorithm to generate one or more control signals to control the operation (e.g., firing) of the source array 80, the source array 86, the source array 142, the source array 144, the source array 146, and/or the source array 148. In other embodiments, individual controllers 90 can each be dedicated to a respective source array 80, source array 86, source array 142, source array 144, source array 146, and source array 148 to generate one or more control signals to control their respective operation.

As illustrated, the vessel 30 tows source array 80 along a shot line 92 and the vessel 30 tows source array 86 along shot line 94. The vessel 30 also tows source array 142 along a shot line 150, source array 144 along a shot line 152, source array 146 along shot line 154, and source array 148 along shot line 156. These shot lines 92, 94, 150, 152, 154, and 156 (and, accordingly, the source array 80, the source array 86, the source array 142, the source array 144, the source array 146, and/or the source array 148) may be a distance 95 apart, for example, 50 meters or another value. The source array 80, the source array 86, the source array 142, the source array 144, the source array 146, and the source array 148 can fire shots in conjunction with a shot sequence.

As additionally illustrated, source array 80 may be horizontally offset by a distance 276 (i.e., $\Delta x_1'$) from the position of source array 80 in FIGS. 11 and 12. Likewise, source array 86 may be horizontally offset by a distance 278 (i.e., $\Delta x_2'$) from the position of source array 86 in FIGS. 11 and 12. Similarly, source array 142 may be horizontally offset by a distance 280 (i.e., $\Delta x_3'$) from the position of source array 142 in FIGS. 11 and 12, source array 144 may be horizontally offset by a distance 282 (i.e., $\Delta x_4'$) from the position of source array 144 in FIGS. 11 and 12, source array 146 may be horizontally offset by a distance 284 (i.e., $\Delta x_5'$) from the position of source array 146 in FIGS. 11 and 12, and source array 148 may be horizontally offset by a distance 286 (i.e., $\Delta x_6'$) from the position of source array 148 in FIGS. 11 and 12.

That is, the marine survey system 22 and/or the marine survey system 31 can be initially set up to have the source arrays 80, 86, 142, 144, 146, and 148 offset from one another along the direction of sail of the vessel 30 and/or, for example, offset relative to a common distance along the direction of sail of the vessel 30. Likewise, one or more of the source arrays 80, 86, 142, 144, 146, and 148 may not be offset, for example, relative to their position in FIGS. 11 and 12 and/or one or more of the source arrays 80, 86, 142, 144, 146, and 148 may be offset by a common value from the vessel 30. These offsets, represented in FIG. 13 by distances 276, 278, 280, 282, 284, and 286, operate to generate asymmetric geometry of the marine survey system 22 and/or the marine survey system 31. These distances 276, 278, 280, 282, 284, and 286 may be fixed values, for example, approximately 1 meter, approximately 2 meters, approximately 3 meters, or another value (in either a positive or negative direction with respect to the vessel 30, i.e., towards or away from the vessel 30) or the distances 276, 278, 280, 282, 284, and 286 may approximately be between 1 meter and 4 meters, between 1 meter and 3 meters, between 1 meter and 2 meters, between 2 meters and 3 meters, between 2 meters and 4 meters, or another value (in either a positive or negative direction with respect to the vessel 30, i.e., towards or away from the vessel 30). Alternatively, the distances 276, 278, 280, 282, 284, and 286 may be approximately 10%, 15%, 20%, 25%, 30%, 35%, 40%, 45%, 50%, 55%, 60%, 65%, 70%, 75%, 80%, 85%, 90%, 95% or 100% of a distance between shots of a shot line, for example, shot line 92 or approximately 10%, 15%, 20%, 25%, 30%, 35%, 40%, 45% or 50% of the distance between shots of a shot line, for example, shot line 92.

Similar to the discussion of FIG. 11 above, the source array 80, the source array 86, the source array 142, the source array 144, the source array 146, and the source array 148 can fire shots. Source array 80 fires shots at shot point positions 85, 87, 89, 91, and 93 and source array 86 fires shots at shot point positions 97, 99, 101, 103, and 105. Likewise, the source array 142, the source array 144, the source array 146, and the source array 148 fires shots, respectively, at shot point positions 160, 162, 164, 166, and 168, shot point positions 170, 172, 174, 176, and 178, shot point positions 180, 182, 184, 186, and 188, and shot point positions 190, 192, 194, 196, and 198).

However, due to the offset of the position of the source arrays 80, 86, 142, 144, 146, and 148, as illustrated in FIG. 13, while the shot point positions 85, 87, 89, 91, 93, 97, 99, 101, 103, 105, 160, 162, 164, 166, 168, 170, 172, 174, 176, 178, 180, 182, 184, 186, 188, 190, 192, 194, 196, and 198 matches that described with respect to FIG. 11 (i.e., the controller 90 generates and transmits control signals in a manner similar to that described above with respect to FIG. 11), the physical location of the source arrays 80, 86, 142, 144, 146, and 148 in FIG. 13 are offset, respectively, by the distances 276, 278, 280, 282, 284, and 286 relative to the physical location of the source arrays 80, 86, 142, 144, 146, and 148 as described in FIG. 11. This offset alters the data generated by the acquisition technique in FIG. 13 relative to the data generated in FIG. 11, as was previously discussed with respect to FIG. 10.

The marine survey system 22 and/or the marine survey system 31 can be initially set up to have the controller 90 generate shots at shot point positions 85, 87, 89, 91, 93, 97, 99, 101, 103, 105, 160, 162, 164, 166, 168, 170, 172, 174, 176, 178, 180, 182, 184, 186, 188, 190, 192, 194, 196, and 198, however, due to the offsets at distances 276, 278, 280, 282, 284, and 286 of source arrays 80, 86, 142, 144, 146, and 148, the data collected will not be representative of data, for example, from a midpoint of distance 96. The controller 90, for example, can control the distances 276, 278, 280, 282, 284, and 286 as being one or more predetermined distances that is generated via alteration of a length of tether 128, tether 130, tether 288, tether 290, tether 292, and tether 294, and/or via alteration of the relative position of sources 78, 84/sub-arrays within the source arrays 80, 86, 142, 144, 146, and 148. For example, a winch or other mechanism may be employed to alter the length of tethers 128, 130, 288, 290, 292, and/or 294. The controller 90 (or another control mechanism) can operate to control the winch or other mechanism to adjust the length of the tethers 128, 130, 288, 290, 292, and/or 294 to one or more respective fixed lengths. Alternatively, tethers 128, 130, 288, 290, 292, and 294 having one or more fixed lengths can instead be utilized to create the distances 276, 278, 280, 282, 284, and 286. A fastener or other connection device may be disposed on or may be part of the source arrays 80, 86, 142, 144, 146, and 148 to couple the tethers 128, 130, 288, 290, 292, and 294 to their respective source arrays 80, 86, 142, 144, 146, and 148.

As illustrated in FIG. 13, different shifts are applied to each of the multiple source arrays 80, 86, 142, 144, 146, and 148 to produce stronger incoherency of blending noise (i.e., the same shift in distance and/or time need not need be applied to each source array 80, 86, 142, 144, 146, and 148 being towed to create more randomness and incoherency of blending noise). The different shifts applied to each of the source arrays 80, 86, 142, 144, 146, and 148 (e.g., shot point positions) may be considered as spatial coding that determines the pattern of blending noise. Every sail line/sequence may share the same spatial code or adopt different spatial codes for each sail line/sequence. Additionally, the controller 90 can generate the control signals in accordance with instructions loaded thereon or the control signals may be determined and generated in real time during the seismic survey by the controller 90.

In some embodiments, one or more of the shot point positions 85, 87, 89, 91, 93, 97, 99, 101, 103, 105, 160, 162, 164, 166, 168, 170, 172, 174, 176, 178, 180, 182, 184, 186, 188, 190, 192, 194, 196, and 198 are additionally dithered. That is, the controller 90 generates the control signals so that the actual position of one or more of the shot point positions 85, 87, 89, 91, 93, 97, 99, 101, 103, 105, 160, 162, 164, 166, 168, 170, 172, 174, 176, 178, 180, 182, 184, 186, 188, 190, 192, 194, 196, and 198 are adjusted by a small amount. This amount may be a fraction of a second, for example, between approximately negative 250 ms and positive 250 ms or another value typically less than one second and may cause the actual position of one or more of the shot point positions 85, 87, 89, 91, 93, 97, 99, 101, 103, 105, 160, 162, 164, 166, 168, 170, 172, 174, 176, 178, 180, 182, 184, 186, 188, 190, 192, 194, 196, and 198 to be moved at a distance 102 (i.e., Δx) from the illustrated locations of the shot point positions 85, 87, 89, 91, 93, 97, 99, 101, 103, 105, 160, 162, 164, 166, 168, 170, 172, 174, 176, 178, 180, 182, 184, 186, 188, 190, 192, 194, 196, and 198, whereby, for example, distance 102 is less than the distances 276, 278, 280, 282, 284, and 286. The dithering of the actual position of one or more of the shot point positions 85, 87, 89, 91, 93, 97, 99, 101, 103, 105, 160, 162, 164, 166, 168, 170, 172, 174, 176, 178, 180, 182, 184, 186, 188, 190, 192, 194, 196, and 198 described above may be varied and the variance can be random, pseudo-random, or according to a pattern. Therefore, the overall shift illustrated in FIG. 13 includes both a dithered distance 102 (e.g., where the distance 102 is changing via a random, pseudo-random, or according to a pattern) and a shifted distance 276, 278, 280, 282, 284, and 286 (e.g., where the distance 126 is fixed, at least for a given shot line, for example, shot line 94).

Technical effects of this disclosure include systems and methods for alteration of seismic acquisitions that result in the variation of the blending noise pattern along different shot lines (i.e. greater incoherency of blending noise) and the ability to control the section of seismic data to be contaminated by blending noise. The acquisition techniques allow for improvements in a deblending process due to the variation of noise pattern and increased incoherency of the blending noise. The techniques include a shift in the physical location of a source relative to another source or a shift in the physical shot point locations of a shot line relative to another shot line or a shift in time that a source is fired relative to firing of another source and a random dithering applied on shot time. Resulting gathers after blending may be relatively clean gathers (in comparison to a gather that was not generated via the disclosed techniques) that may be used both for imaging, prestack analysis such as AVO (Amplitude vs. Offset) analysis, and velocity-model building, for example, by Full-Waveform Inversion (FWI). Thus, these recovery and processing operations described herein may cause improved data inputs into seismic image generators. When data inputs into the seismic image generators are improved, the resulting seismic image may also improve, causing an improvement of a representation of hydrocarbons in a subsurface region of Earth or of subsurface drilling hazards.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method of seismic acquisition, comprising:
positioning a first source array at a first distance from a vessel along a shot line direction;
positioning a second source array at a second distance from the vessel along a shot line direction, wherein the second distance along the shot line direction differs from the first distance along the shot line direction;
firing the first source array at a first shot point position; and
firing the second source array at a second shot point position subsequent to the firing of the first source array and prior to another firing of the first source array to activate the first source array and the second source array in an interleaving manner, wherein the first shot position and the second shot point position are separated by a fourth distance, wherein the firing of the first source array or the second source array is dithered by a pseudo-random amount of time to modify the fourth distance between the first shot point position and the second shot point position,
wherein activating the first source array and the second source array in an interleaving manner and dithering the firing of the first source array of the second source array by the pseudo-random amount of time produces a spatial coding pattern on the first shot position of the first source array and the second shot position of the second source array, wherein the spatial coding pattern is used to determine a pattern of blending noise between the firing of the first source array and the second source array.

2. The method of claim 1, wherein the first source array is dithered.

3. The method of claim 1, wherein the second source array is dithered.

4. The method of claim 1, comprising:
utilizing a tether having a first length to position the first source array at the first distance from the vessel; and
utilizing a second tether having a second length to position the second source array at the second distance from the vessel.

5. The method of claim 1, comprising altering a length of a tether coupled to the second source array to position the second source array at the second distance from the vessel.

6. The method of claim 1, comprising:
disposing the first source array comprising a plurality of seismic sources over a seismic survey region prior to firing the first source array; and disposing the second source array comprising a second plurality of seismic sources over the seismic survey region prior to firing the second source array.

7. The method of claim 6, comprising towing the first source array and the second source array behind the vessel.

8. The method of claim 1, comprising:
positioning a third source array at a fifth distance from the vessel, wherein the fifth distance differs from at least one of the first distance and the second distance; and
firing the third source array subsequent to firing the first source array and prior to the another firing of the first source array.

9. A system, comprising:
a first source array that when in operation is coupled to a first tether having a first length;
a second source array that when in operation is coupled to a second tether having a second length that differs from the first length; and
a controller coupled to the first source array and the second source array and configured to:
transmit a control signal to fire the first source array at a first shot point position; and
transmit a second control signal to fire the second source array at point position subsequent to firing of the first source array and prior to another firing of the first source array to activate the first source array and the second source array in an interleaving manner, wherein the first shot point position and the second shot point position are separated by a distance, wherein the firing of the first source array or the second source array is dithered by a pseudo-random amount of time to modify the distance between the first shot point position and the second shot point position,
wherein activating the first source array and the second source array in an interleaving manner and dithering the firing of the first source array or the second source array by the pseudo-random amount of time produces a spatial coding pattern on the first shot position of the first source array and the second shot position of the second source array, wherein the spatial coding pattern is used to determine a pattern of blending noise between the firing of the first source array and the second source array.

10. The system of claim 9, comprising a winch that when in operation adjusts the second length of the second tether.

11. The system of claim 10, wherein the controller when in operation transmits a third control signal to control operation of the winch.

12. The system of claim 9, wherein the second source array comprising a fastener that when in operation couples the second tether to the second source array.

13. The system of claim 9, comprising a third source array that when in operation is coupled to a third tether having a third length that differs from at least one of the first length and the second length, wherein the controller when in operation transmits a third control signal to fire the third source array subsequent to firing the first source array and prior to the another firing of the first source array.

14. The system of claim 9, comprising a vessel that when in operation is coupled to the first tether and the second tether to tow the first source array and the second source array to acquire a seismic dataset of a seismic survey that images at least a portion of a predetermined volume of Earth.

15. A method of seismic acquisition, comprising:
positioning a first source array along a first shot line;

positioning a second source array along a second shot line;

generating a first control signal to fire the first source array at a dithered first time at a first shot point position, wherein the dithered first time comprises a first adjustment to a first time at which firing of the first source array occurs by a random amount of time, a pseudo random amount of time, or according to a pattern to modify the first shot point position of the first source array; and generating a second control signal to fire the second source array at a shifted dithered second time and at a second shot point position subsequent to firing of the first source array and prior to another firing of the first source array to activate the first source array and the second source array in an interleaving manner, wherein the shifted dithered second time comprises a second adjustment to a second time at which firing of the second source array occurs by a second random amount of time, a second pseudo-random amount of time, or according to a second pattern to modify a distance between the first shot point position of the first source array and the second shot point position of the second source array, wherein activating the first source array and the second source array in an interleaving manner and dithering the firing of the first source array or the second source array by the pseudo-random amount of time produces a spatial coding patter on the first shot position of the first source array and the second shot position of the second source array, wherein the spatial coding pattern is used to determine a pattern of blending noise between the firing of the first source array and the second source array.

16. The method of claim 15, comprising:

transmitting the first control signal to the first source array; and firing the first source array at the dithered first time based upon the first control signal.

17. The method of claim 16, comprising:

transmitting the second control signal to the second source array; and firing the second source array at the shifted dithered second time based upon the second control signal as triggered by an expected arrival time of the second source array over a shot grid after shifting a fixed distance for a second shot line plus the shifted dithered second time by the random amount of time, the pseudo-random amount of time, or according to the pattern.

18. The method of claim 15, comprising:

positioning a third source array along a third shot line; and generating a third control signal to fire the third source array at a shifted dithered third time, wherein the shifted dithered third time comprises a third adjustment to a third time at which firing of the third source array occurs by a third random amount of time, a third pseudo-random amount of time, or according to a third pattern to modify a third distance between the shot point position of the second source array and the shot point position of the third source array.

19. The method of claim 1, wherein the spatial coding pattern is used to deblend seismic data obtained from the firing of the first source array and the second source array.

20. The system of claim 1, wherein the spatial coding pattern is used to deblend seismic data obtained from the firing of the first source array and the second source array.

* * * * *